United States Patent [19]
Imai et al.

[11] Patent Number: 5,802,298
[45] Date of Patent: Sep. 1, 1998

[54] DEFECT-FREE TYPE REMOTE PROCEDURE CALL SYSTEM AND METHOD THEREOF

[75] Inventors: Yuji Imai; Hidenobu Ito; Masahiro Komura, all of Kanagawa, Japan

[73] Assignee: Fujitsu Limited, Kawasaki, Japan

[21] Appl. No.: 703,059

[22] Filed: Aug. 26, 1996

[30] Foreign Application Priority Data

Aug. 28, 1995 [JP] Japan .................................. 7-218391

[51] Int. Cl.$^6$ .................................................. G06F 17/00
[52] U.S. Cl. ............................................... 395/200.47
[58] Field of Search ................ 395/200.47, 200.48, 395/200.49, 200.32, 200.33, 182.04, 676, 615

[56] References Cited

U.S. PATENT DOCUMENTS

| | | | |
|---|---|---|---|
| 4,530,051 | 7/1985 | Johnson et al. | 395/200.33 |
| 5,253,342 | 10/1993 | Blount et al. | 395/200.62 |
| 5,276,871 | 1/1994 | Howarth | 395/600 |
| 5,371,889 | 12/1994 | Klein | 395/676 |
| 5,448,698 | 9/1995 | Wilkes | 395/200.73 |
| 5,513,314 | 4/1996 | Kandasamy et al. | 395/182.04 |
| 5,561,769 | 10/1996 | Kumar et al. | 395/200.32 |

*Primary Examiner*—Ellis B. Ramirez
*Attorney, Agent, or Firm*—Armstrong, Westerman, Hattori, McLeland & Naughton

[57] ABSTRACT

When a client sends an RPC request that requests a server for a service, the client adds identification information to the RPC request. When an active server receives an RPC request, it stores the identification information thereof in a stable area that is not destroyed even if a defect takes place in the client or the server, and executes the requested service. When a defect takes place in the active server, the backup server takes over the process of the active server. A PALIB of the backup server compares the identification information of the RPC request re-sent from the client with the identification information in the stable area. When they match, the PALIB determines that the RPC request is redundant. The backup server performs a redundant process and sends back the correct result to the client.

32 Claims, 19 Drawing Sheets

| PORT ALIAS IDENTIFIER | REGISTERED PORT | REGISTERED PROCESS | MARK OF SERVICE |
|---|---|---|---|
| PA1 | PORT1 | PROCESS1 | O |
| | PORT2 | PROCESS2 | |
| PA2 | PORT3 | PROCESS1 | |
| | PORT4 | PROCESS2 | O |
| PA3 | PORT5 | PROCESS1 | O |

F I G. 4

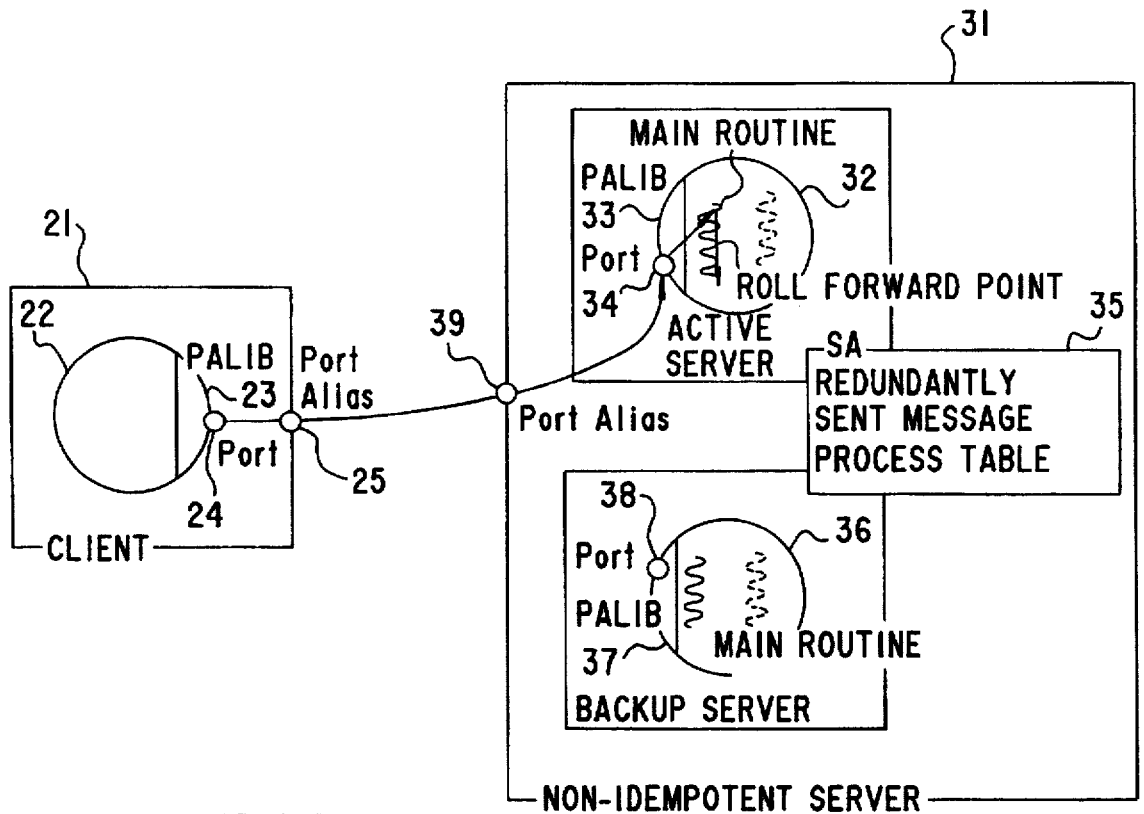
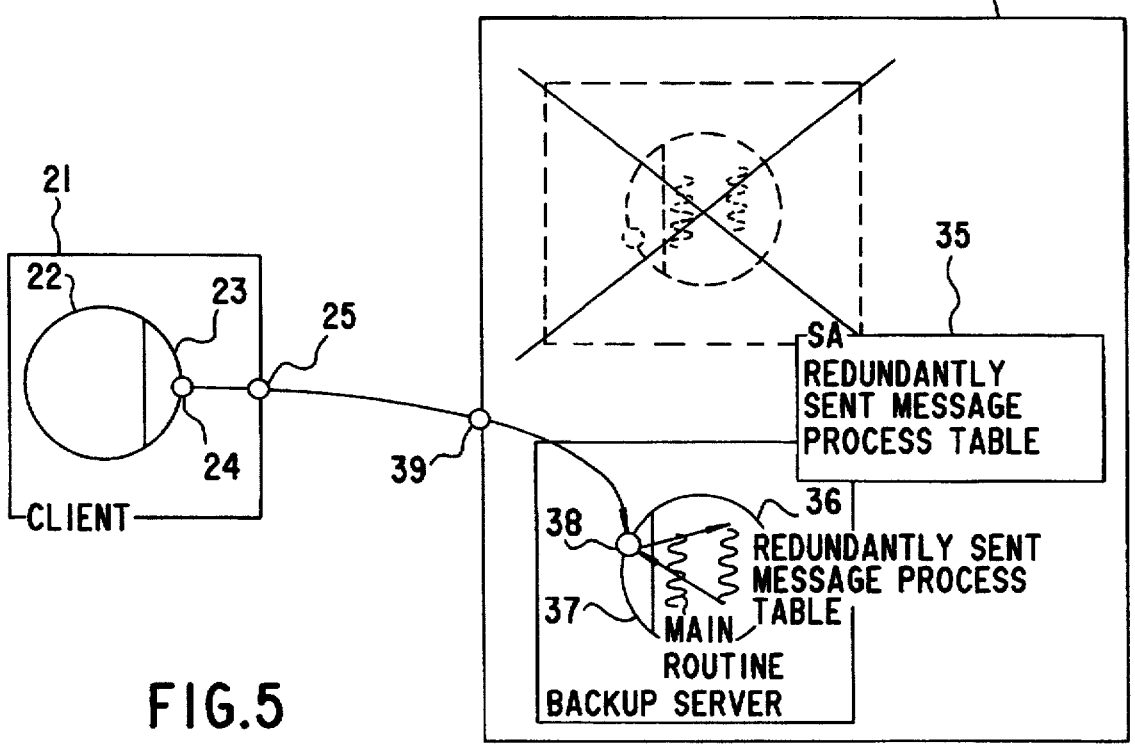
FIG.5

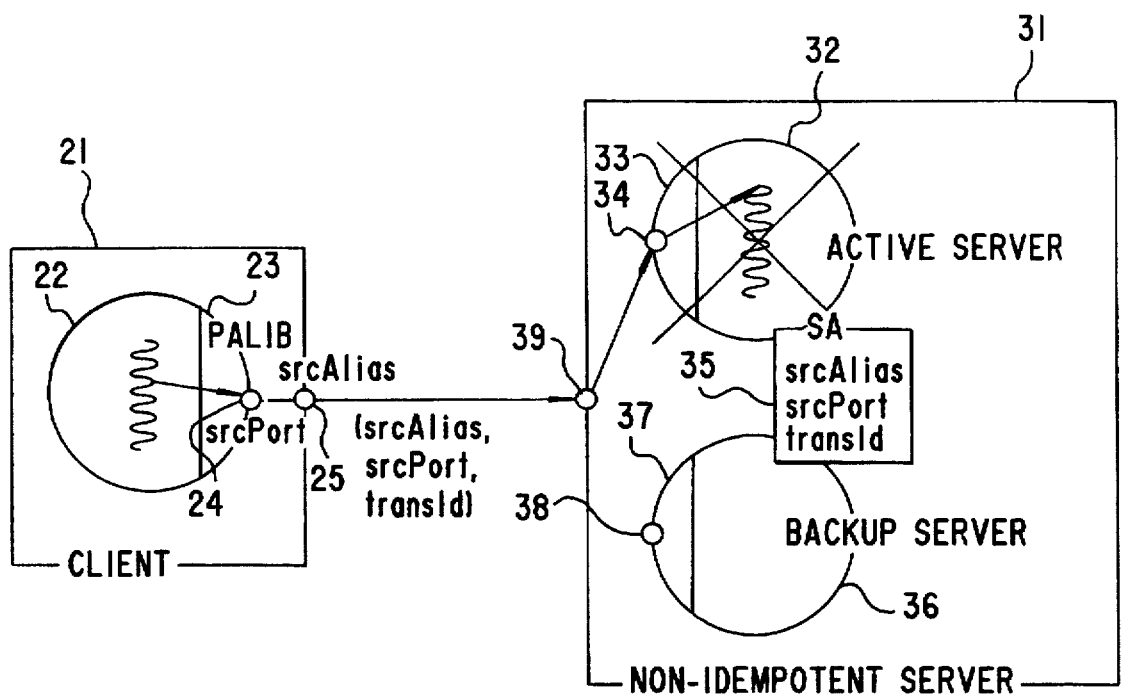
IF DEFECT TAKES PLACE IN ACTIVE SERVER
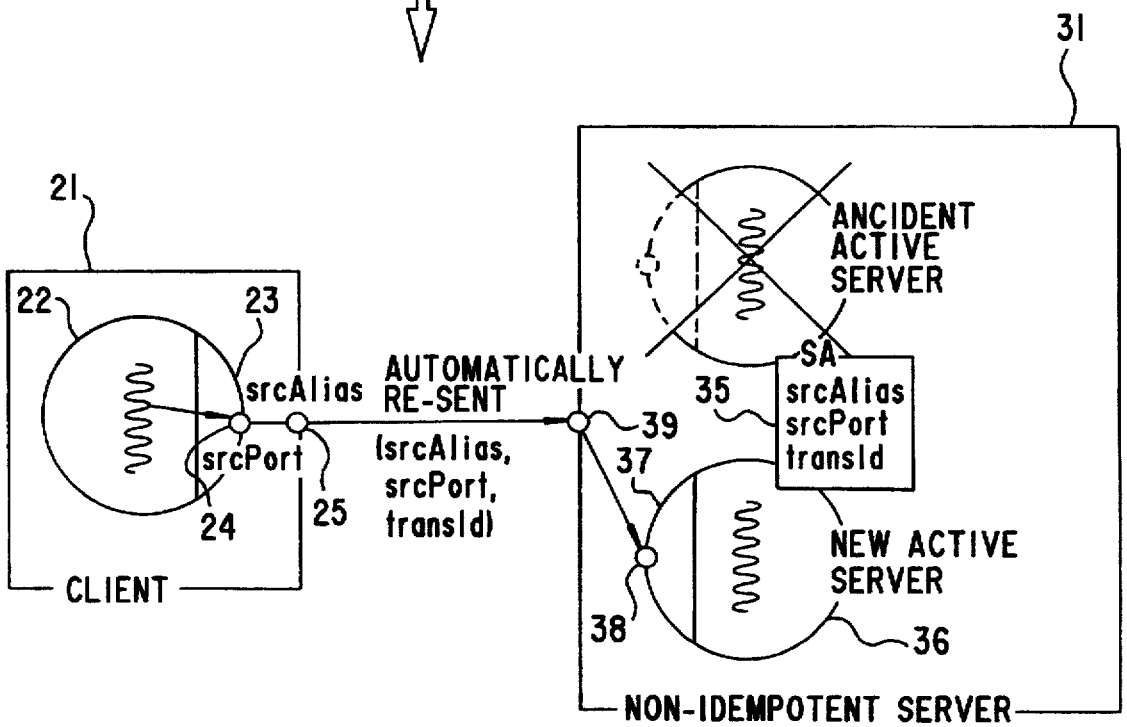
FIG.6

```
PA_Call( SENDER ADDRESS, RECEIVER ADDRESS, message ) { message_ID = TRANSACTION COUNTER;
    INCREMENT THE VALUE OF THE TRANSACTION COUTER;
    ADD AN IDENTIFIER ( srcPort, message_ID) TO MESSAGE
    ipcCall( );   /* SEND THE MESSAGE */

```
serverMainLoop ( )  { /* AFTER THE SERVER IS INITIALIZED */
                    /* THIS ROUTINE IS EXECUTED          */ while ( TRUE ) { / * Loop */
        PA receive ( request );
        switch ( request.operand ) {  /* FOR EACH REQUEST TYPE   */
                                      /* A PROCESS ROUTINE IS CALLED */
            case FILE DELETE:
                file dalete( request );

case FILE CREATE:
                file create( request );

case .....
                 ......
                 ......
        }
    }
} file delete( request ) {   /* file delete PROCESS */

PA blockRequest( );
    DELETE A FILE
    PLACE THE RESULT IN REPLY
    PA setRedProcess ( AUTO REPLY, reply );
      /* REGISTER THE PROCESS WHEN A REDUNDANTLY SENT MESSAGE IS DETECTED  */
    ipcReply( reply );  /* SEND BACK THE RESULT TO CLIENT */
}
```

FIG. 10

```
PA Recieve( message )   { /* FUNCTION PROVIDED BY PALIB */
                         /* SSC CALLS THIS FUNCTION TO RECEIVE A MESSAGE */ while ( TRUE ) { / * LOOP */ ipcReceive( message )   /* RECEIVE A MESSAGE */
        EXTRACT IDENTIFIER (srcPoet, message ID) FROM MESSAGE;
        PROCESS TABLE IN THE SA WITH rslt = MESSAGE ID AND srcPort if ( rslt = FOUND)
        {
            READ A PROCESS PEFORMED UPON DETECTION OF A REDUNDANTLY
            SENT MESSAGE FROM PROCESS TYPE = SA switch ( process type )

case  AUTOMATIC RESULT REPLY:
                      COPY THE CONTENT OF THE REPLY MESSAGE OF SA TO REPLY;
                      ipcReply( reply );  /* SEND BACK THE RESULT */
                      continue; /* RETURN TO THE TOP OF THE LOOP */ case REDUNDANTLY SENT MESSAGE HANDLER:
                      function = POINTER OF HANDLER FUNCTION;
                      COPY DATA GIVEN FROM SA TO arg UPON;
                      (*function)( *arg, message, reply );
                      ipcReply( reply );   /* SEND BACK THE RESULT */
                      countinue: /* RETURN BACK THE TOP OF THE LOOP */
        }
        else
        { /* THE REDUNDANTLY SENT MESSAGE HAS NOT BEEN REGISTERED */
            break;  /* EXIST FROM THE LOOP */
        }
    }
}
```

F I G. 1 2

```
PA blockRequest( ) {

REGISTER INFORMATION TO SA SO THAT THE EXECUTION OF THE RE-SENDING
    OPERATION IS TEMPORARILY STOPPED FOR AN IDENTIFIER OF A REQUEST
    THAT IS BEING EXECUTED;
}

PA_setredProcess( type, reply ) {

WRITE A REDUNDANTLY SENT MESSAGE DETECTION REGISTRATION TO SA FOR
    AN IDENTIFIER OF A REQUEST THAT IS BEING EXECUTED
            /* WHEN REGISTERED type
                ( AUTO_REPLY or REDUNDANT_MESSAGE_HANDLER )   */
            /*                                      reply
                (MESSAGE AUTOMATICALLY REPLIED WHEN AUTO_REPLY IS DESIGNATED)*/
            /*                                      arg
                ( DATA GIVEN TO THE REDUNDANTLYENT MESSAGE HANDLER
                    WHEN REDUNDANT_MESSAGE_HANDLER IS DESIGNATED )  */
            /*
    IN THE CASE OF PA_block Request ( ), THE REGISTERED BLOCK IS ERASED

DEFECT-FREE TYPE REMOTE PROCEDURE CALL SYSTEM AND METHOD THEREOF

BACKGROUND OF THE INVENTION

1. Field of the Invention

The present invention relates to a highly available computer system for facilitating a backup system to execute a process of an active system when a partial defect takes place in hardware or software of the active system.

2. Description of the Related Art

In recent years, a method for accomplishing one complete process with a plurality of divided processes has been used. The divided processes are allocated to processors that are not affected by defects in the other processors. A backup process is disposed in each active process. Thus, a system in which a partial defect of the system does not stop the entire service, can be accomplished.

Each of functionally divided processes sends a request of a service to another process through an inter-process communication. The requested process sends back the result of the service to the requesting process. To perform the inter-process communication, a sender process allocates a receiver process to which the sender process sends a message that is a communication unit. At this point, the sender process uses an identifier that identifies a receiver process. The address of one identifier has two meanings.

(A) Representing one process (port)

(B) Representing a plurality of processes (port group)

When a sender process sends a message to a port as an address, a process that has the port receives the message. When the sender process sends a message to a port group as an address, the message is sent to one of the processes of the port group. A port to which the message is sent depends on the structure of the inter-process communication.

In a conventional defect-free RPC (remote procedure call) system, to accomplish a highly available computer system having a plurality of processes, an automatic re-sending system or a manual re-sending system for a message is used. Thus, even if a defect takes place in a sender process, the sender process are not required to countermeasures thereof. With the automatic/manual re-sending system, even if a defect takes place in a fault-tolerant (FT) type processing system while it is executing an RPC, the service can be continued according to the RPC request that has not been sent upon occurrence of the defect is re-sent.

In recent years, a distribution system in which the processing of a system is distributed into a plurality of processing portions and these processing portions are connected by a communication network is known. In the distribution system, the system that is improved detect resistance by disposing a plurality of processing systems that perform the same service, is suggested. At this point, when a particular processing portion does not operate, a procedure for matching the process of the backup system with the process of the failed active system and for making the backup system restore the operation, is required.

In the case that a remote process performed by hardware and software through a communication line is relayed among a plurality of processing portions, a problem for securely matching a service that was performed before a defect took place in a relay processing portion, with a service that is re-sent, arises. In a distributed processing system, a service request may be sent from a processing portion A to a processing portion B. The processing portion B may relay a part of the process to a processing portion C. The processing portion C may perform the service. In this case, the processing portion B is referred to as a relay processing portion.

Now, assume that a service request is sent from the processing portion A, the service request is relayed to the processing portion B, the service request is received by the processing portion C, and then a particular process is performed by the processing portion C. After the service request is sent to the processing portion C, when a defect takes place in the relay processing portion B, a substitute processing portion B' of the processing portion B is prepared. Thereafter, the processing portion A reissues a service request with a re-sending function of the communication system. The substitute processing portion B' relays the re-sent service request and the processing system C resumes the service. A processing portion that sends a service request, as in the processing portion A, is referred to as a client. A processing system that provides a service, as in the processing portion C, is referred to as a server. Further, a processing portion that relays a service, as in the processing portions B and B', is referred to as a relay server. When the server executes a service corresponding to an RPC service request received from a client, after the server has performed the service, the server may not return to the state it was in before it performed the service. In this case, the RPC is referred to as an non-idempotent RPC. In the case of the non-idempotent RPC, even if the client re-sends the same message and the server re-executes the service request, the same result may not be obtained or an improper side effect may take place.

An example of the non-idempotent process is a deletion of a file or a directory. Now, assume the following situation. A client sends a first delete request to a server. The server executes this request. While the result is being returned to the client, a defect takes place. At this point, if the delete request is re-sent and the request is simply re-executed, the server determines that the client has requested a deletion of a file or a directory that does not exist. Thus, the server returns an error message to the client. In the RPC re-sending operation that requests such a non-idempotent process, a re-sending operation that has been executed by the server and that redundantly takes place is referred to as a redundant re-sending operation.

In a server-client type processing system, when the server is performing a non-idempotent RPC process, if a particular transaction is re-sent due to a particular cause, unless the server detects the transaction is resent and returns the lost process result to the client, it cannot be said that the server returns a correct result to the client. A system that detects the re-sent request and returns a correct result upon occurrence of the re-sent message is a redundantly sent message detecting system. The redundantly sent message detecting system can be accomplished by various methods. As a simple method, a processing portion that detects a redundantly sent message has stored a transaction of a non-idempotent process and the result thereof. When the same transaction is requested, the processing portion returns the stored result.

However, the conventional defect-free type RPC system has the following problems.

The conventional re-sending system does not have a supporting system that automatically supports the above-described non-idempotent process. Thus, a processing code that detects a redundantly sent message should be added to both processing programs of the client and the server beforehand. Thus, to handle a redundantly sent message, the load of the programers increases.

In the case that a plurality of processing portions compose a system in a communication network, when the communication system conceals a defect in communications, a relay processing system should assure the consistency of the received communication and the sent communication until the system is restored from the defect.

For example, in the case that the processing portion A requests the processing portion C for a service through the processing portion B, after the processing portion B relays the service to the processing system C, a defect takes place in the processing portion B. At this point, the processing portion A is still sending the service request. The processing portion C continues the process regardless of the defect in the processing portion B. To allow the substitute processing portion B' to restore the sequence of communications, the communication system should relay the re-request of the service to the processing portion A and the relay processing portion B' should relay the request of the service to the processing portion C.

The processing portion C has a defect concealing system. With the defect concealing system, if the processing portion C executes a non-idempotent service, when it receives the reprocess request, it does not execute the process, but returns the result. To cause the redundantly sent message detecting system of the processing portion C to operate, the processing portion B' should issue to the processing system C a request that is the same as the former one. However, a technology that assures the equality of a re-issued request against the original request has not yet been established.

SUMMARY OF THE INVENTION

An object of the present invention is to provide a defect-free type RPC system for easily re-sending a request message and correctly returning a reply message, in the case that a partial defect takes place in a highly available computer system and a method thereof.

The present invention relates to a defect-free type RPC system in which a first process requests a second process for a service through a communication network, and the second process returns the result of the request to the first process. The defect-free type communication system has a port managing portion, an identifier adding portion, a sending portion, a detecting portion, a replying portion, a first storing portion, a second storing portion, and a relaying portion.

The port managing portion manages the relation of an identifier of a port set that is sent a request message from the first process to the second process and port identifiers of ports of the processes of the set. In other words, the port managing portion stores and manages information in which the port of each process is included in a certain port set.

The identifier adding portion adds identification information to a request message. The identification information is composed of, for example, a port identifier of a sender process of a message, a port set identifier of a receiver, an incarnation identifier, a transaction identifier, and so forth.

The sending portion sends from the first process to the second process the request message in which the identification information has been added by the identifier adding portion.

The detecting portion receives the request message, checks the identification information of the request message, and automatically detects whether or not the request message is a redundantly re-sent message.

When the detecting portion detects a redundantly re-sent message, it performs a redundant process and returns the result of the process performed by the second process to the first process.

The first storing portion stores a redundantly sent message process table having identification information of the request message received by the detecting portion. Even if a defect takes place in the first or second process, the content of the redundantly sent message process table stored in the first storing portion is not lost.

The relaying portion has a first relay process that relays a request message from the first process to the second process, and a second relay process that takes over the process of the first relay process when a defect takes place in the first relay process.

The second storing portion stores the relation between the identification information of the request message and the identification information of the relay message. The content of the second storing portion is not lost when a defect takes place in the first relay process.

When the first process sends a message that requests a service to the second process, the identifier adding portion adds identification information to the request message. The sending portion sends the request message added the identification information to the second process as a relay message. The relaying portion relays the request message received from the first process to the second process. The relation between the identification information of the request message and the identification information of the relay message is stored in the second storing portion. The detecting portion determines whether or not the message is a redundantly re-sent message corresponding to the identification information adding the message and the content of the redundantly sent message process table stored in the first storing portion. When the message is a redundantly re-sent message as the determined result of the detecting portion, the replying portion performs the redundant process and sends the result of the service of the second process to the first process.

While a communication is being performed, even if a defect takes place in the first process or the second process, since the redundancy process table stored in the first storing portion is not destroyed, the detecting portion can always correctly detect the redundancy. Thus, even if the second process performs a non-idempotent process, a correct result is sent back in relay to a redundantly sent message of a request message.

In addition, when a defect takes place in the first relay process, the second relay process can take over a process that is being relayed corresponding to the relation between the request message and the relay message, stored in the second storing portion. Thus, in the take-over process that convectly takes over the process of the active system, when a defect takes place in the relay process, the process of the active system and the process of the backup system are securely matched.

The second relay process re-sends the relay message of the first relay process to the second process and transfers the reply message thereof to the first process. Thus, the first process can receive a correct process result.

As described above, the processing system that relays a message stores information of communications. When a process request is reissued due to an occurrence of a defect, stored information is used by a substitute processing system. Thus, the process of the active system and the process of the backup system can be securely matched. Consequently, the defect of the path of the message can be concealed. A service of which processes can be matched against a defect that takes place while a message is being relayed and the system is being restored from the defect can be accomplished.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 4 is a schematic diagram showing a port alias table;

FIG. 5 is a schematic diagram showing a redundantly sent message detecting system;

FIG. 6 is a schematic diagram showing an automatic sending operation upon occurrence of a defect in a server;

FIG. 9 is an example of a programming code of the library on the client side;

FIG. 10 is an example of a programming code of a receiving process of a server;

FIG. 12 is an example of a programming code of the library of a receiving process on the server side;

FIG. 13 is an example of a programming code of a library of a registering process on the server side;

DESCRIPTION OF THE PREFERRED EMBODIMENTS

Figure 1:
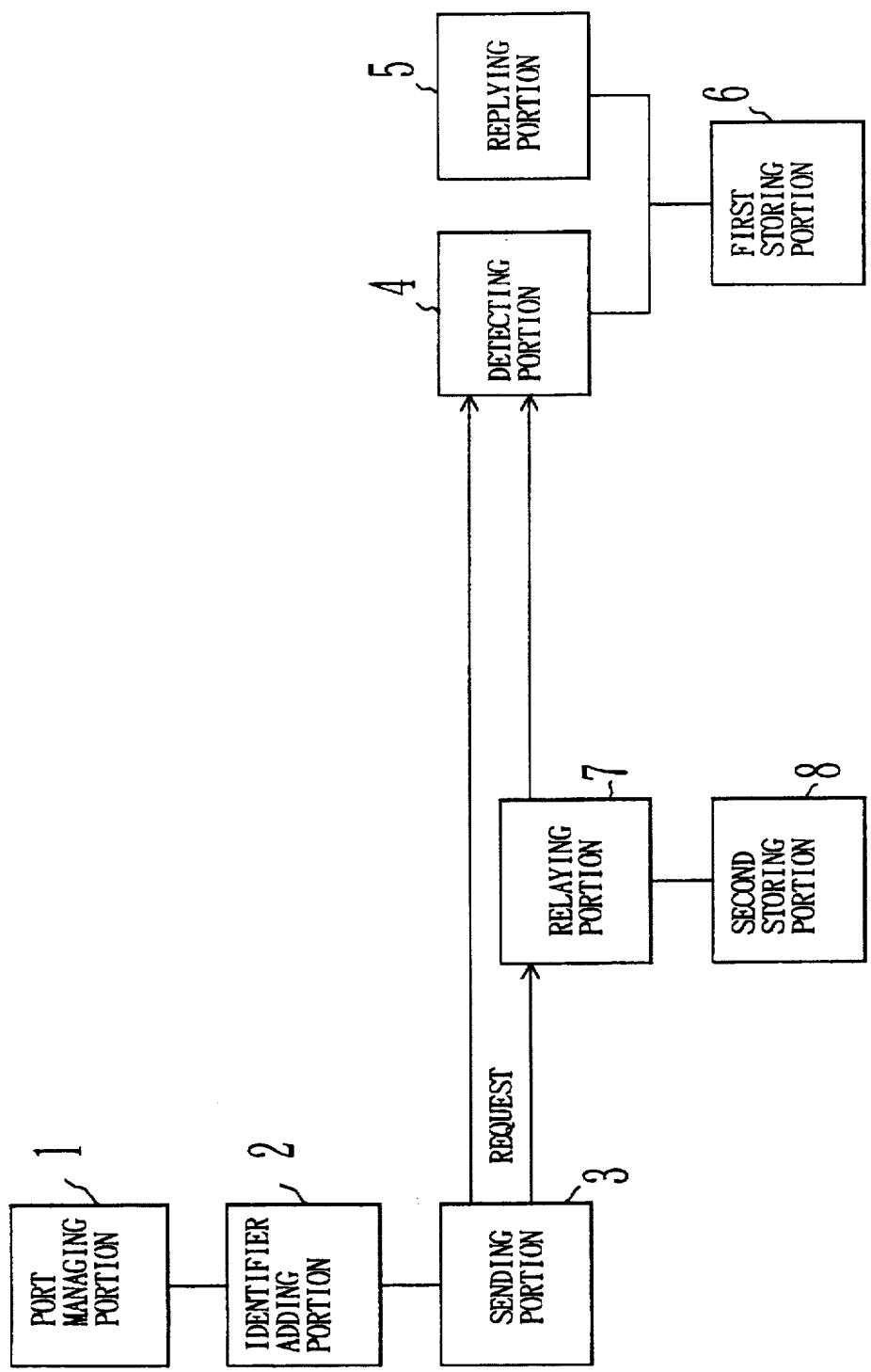
FIG. 1 is a block diagram showing the theory of a present invention.

FIG. 1 is a block diagram showing the theory of a defect-free type communication system according to the present invention.

The defect-free type communication system shown in FIG. 1 is a system in which a first process requests a service to a second process through a communication network, and the second process sends back the requested result to the first process. The defect-free type communication system comprises a port managing portion 1, an identifier adding portion 2, a sending portion 3, a detecting portion 4, a replying portion 5, a first storing portion 6, a relaying portion 7, and a second storing portion 8.

The port managing portion 1 manages the relation between a port set identifier of a port set of a set of processes that send request messages and port identifiers of ports of processes of the set.

The identifier adding portion 2 automatically adds identification information including the same port set identifier to a first sending operation and a re-sending operation of a request message.

The sending portion 3 sends a request message to which the identification information has been added from the first process to the second process.

The detecting portion 4 receives the request message, checks the identification information of the request message, and automatically detects whether or not the request message is a redundantly re-sent message.

When the detecting portion 4 detects a redundantly re-sent message, the replying portion 5 performs a redundantly sent message process and replies with the result of the process of the second process to the first process.

The first storing portion 6 stores a redundantly sent message process table that has identification information of the first request message received by the detecting portion 4. The content of the redundantly sent message process table is not lost even if a defect takes place in the first or second process.

When the identification information of the second request message received after the first request message matches the identification information stored in the redundantly sent message process table, the detecting portion 4 determines that the second request message is a redundantly re-sent message.

The relaying portion 7 has a first relay process that relays a request message received from the first process and sends the relay message to the second process and a second relay process that takes over the first relay process when a defect takes place in the first relay process.

The second storing portion 8 stores the relation between the identification information of the request message and the identification information of the relay message. When a defect takes place in the first relay process, the content of the table is not lost.

The second relay process takes over the process of the first relay process in which a defect takes place with reference to the information stored in the second storing portion 8 and re-sends the relay message that was being relayed by the first relay process to the second process. When the first process re-sends the request message, the second relay process sends back the reply message of the second process to the first process.

For example, the first and second processes accord with a client and a server, respectively. In addition, the port managing portion 1 shown in FIG. 1 accords with a port alias manager 12 shown in FIG. 2. The identifier adding portion 2 accords with PALIBs 23, 43, and 46 shown in FIGS. 5, 6, and 7. The sending portion 3 accords with a communicating portion 81 shown in FIG. 19. The detecting portion 4 and the replying portion 5 accord with PALIBs 33, 37, and 53 shown in FIGS. 5, 6, and 7, respectively. The first storing portion 6 accords with stable areas 35 and 56. The first and second relay processes of the relaying portion 7 accord with relay servers 61 and 62 shown in FIG. 14, respectively. The second storing portion 8 accords with a stable area 63. The port managing portion 1 stores the relation between a port set identifier of a port set of communication ports provided for a set of sender processes and port identifiers of ports of processes included in the set. This port set is referred to as a port alias. The identifier adding portion 2 adds the same port alias identifier as identification information to a request message that is first sent and a request message that is re-sent and re-executed.

The detecting portion 4 compares the identification information of the first request message and the identification information of the re-sent request message with reference to the redundantly sent message process table stored in the first storing portion 6. When they match, the detecting portion 4 determines that the re-sent message may be redundant. At this point, when the second process has executed a service and it has been determined that the re-sent message is redundant, the replying portion 5 performs the redundantly sent message process and sends back the result of the execution of the service to the first process.

Since the content of the redundantly sent message process table is not destroyed even if a defect takes place in the first or second process, the detecting portion 4 can always correctly detect a redundantly sent message. Thus, even if the second process performs a non-idempotent process, a correct result is sent back in reply to a redundant sending operation of a request message.

In addition, the second relay process can correctly take over the first relay process in which a defect takes place by making reference to the relation between the request message stored in the second storing portion 8 and the relay message. Thus, when the take-over process from the active system to the backup system is performed due to an occurrence of a defect in a relay process, the process of the active system and the process of the backup system can be matched.

The second relay process re-sends the relay message of the first relay process to the second process and transfers a reply message thereof to the first process. Thus, the first process can correctly receive the result of the second process.

In such a manner, the processing system that relays a message stores information of communications. When a re-process request is issued upon occurrence of a defect, a substitute processing system uses the stored information. Thus, the process of the active system and the process of the substitute system can be matched. Consequently, a defect on a path can be concealed. With such a relaying function, even if a defect takes place while a message is being relayed, a manager of a service realizes services in which the process of the active system and the process of the backup system are matched can be satisfied.

Next, with reference to the accompanying drawings, an embodiment of the present invention will be described in detail.

Figure 2:
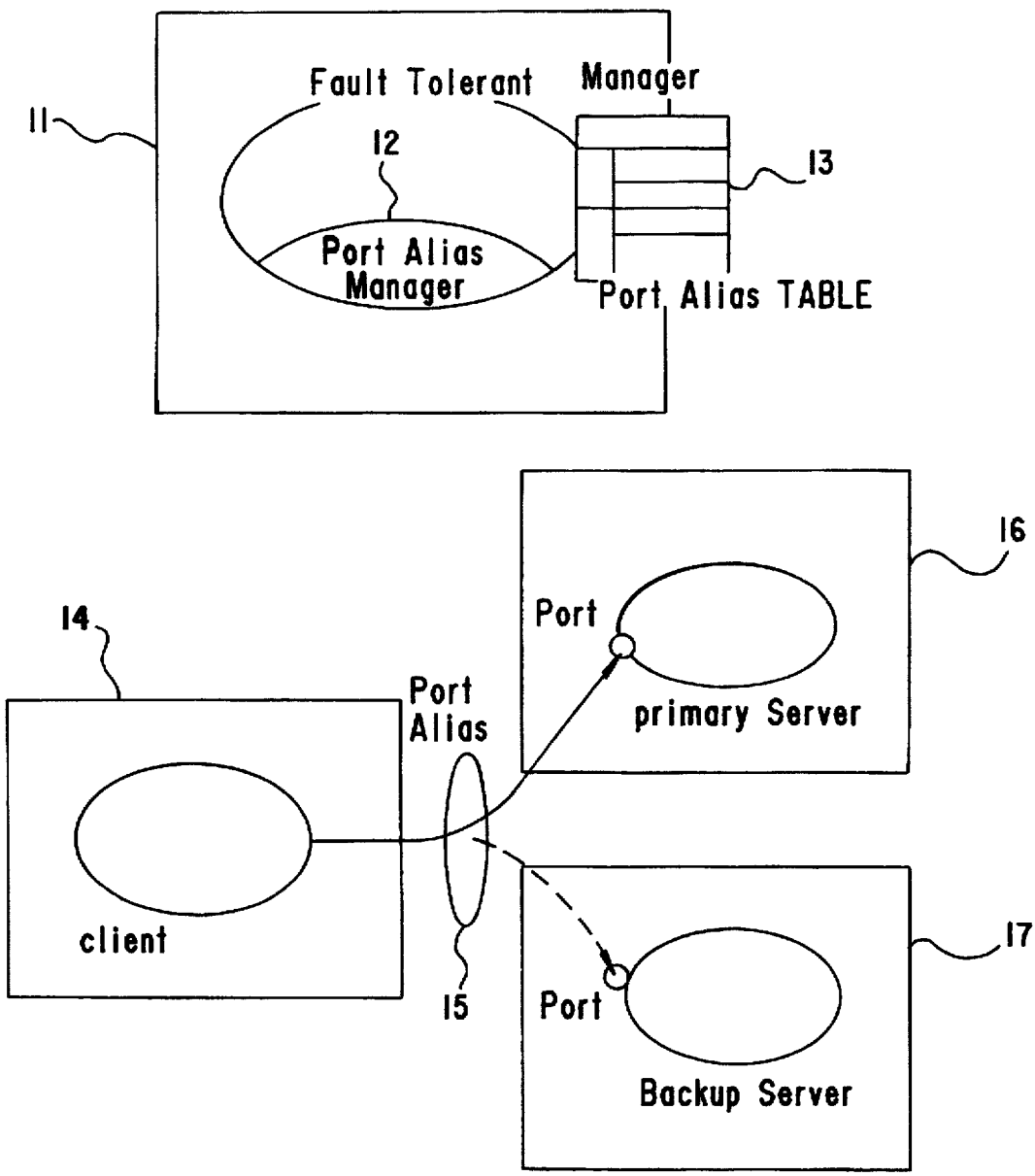
FIG. 2 is a schematic diagram showing a defect management system according to an embodiment of the present invention.

FIG. 2 shows a defect managing system for use with a defect-free type RPC system according to the present invention. In FIG. 2, a port to a set of processes that provide services to a client 14 (request sender process) is referred to as a port alias. In this example, a port alias 15 is connected to a port of a primary server 16 and a port of a backup server 17.

A request sender process sends an identifier that represents a port alias as an address of an inter-process communication to an inter-process communication system. The inter-process communication system selects a port of a process that is currently providing a service from a plurality of ports registered in the port alias and sends a message to the port.

A highly available computer system with a plurality of processes has a defect managing system that manages the placement of processes and switching of the processes. In FIG. 2, a fault tolerant manager (FTM) functions as a defect managing system. The FTM 11 has a port alias manager (PAM) 12. The FTM 11 stores information that represents, for example, the generation, erasure, and service of processes of the entire system, as a management table.

In addition, the PAM 12 has a port alias table 13 that is a table of all port aliases in the entire system. The port alias table 13 registers ports of port aliases and processes of the ports. A port of a process that is currently performing a service has a mark that represents a service mode.

The service providing side generates one port alias identifier when the primary server 16, which is a first process, is generated. In addition, the service providing side notifies the PAM 12 that the port thereof is included in the port alias 15. Thus, the PAM 12 registers the information of the port alias 15 to the port alias table 13. A backup server 17 that is a backup process of the primary server 16 inquires the FTM 11 for the identifier of the port alias 15 and notifies the PAM 12 that the port thereof is included in the port alias 15 in which the primary server 16 is included. Thus, the port of the backup server 17 is registered to the same port alias 15 of the port of the primary server 16.

The client 14 calls the inter-process communication system so as to send a message with a port alias identifier to the address. The inter-process communication system selects a port that is providing a service from those registered in the port alias and sends a message that requests a service to the port.

When a defect takes place, the FTM 11 detects a generation/erasure of a process and notifies the PAM 12 of a defective process. The PAM 12 deletes a port registered by a defective process from a port alias in the port alias table 13. When a backup process is newly activated, the backup process sends a registration request including a port identifier thereof and a port alias identifier thereof to the PAM 12. The PAM 12 registers a backup process to the port alias table 13.

In FIG. 2, when a defect takes place in the primary server 16, the backup server 17 is activated instead. The backup server 17 is registered in the port alias table 13.

Thus, a message that is sent from a process that requests a service to a port alias automatically reaches a process that provides the service. By inquiring a port alias instead of a port that provides a service, with the same identifier, even after a defect takes place, the communication can be continued with a process that provides the service. The port alias is a virtual address that is used when a RPC is requested to a process that is providing a service. The port alias does not vary even if a process is taken over by a substitute system due to a defect of the active system.

Likewise, the port alias can be defined for a process that requests a service. In this case, the port alias represents a port of a set of a plurality of request sender processes. The port alias is a virtual sender that is used when an RPC is requested. The virtual sender is also managed by the PAM 12 corresponding to the port alias table 13. When a service is taken over by a backup system, the port alias is not varied.

Figure 3:
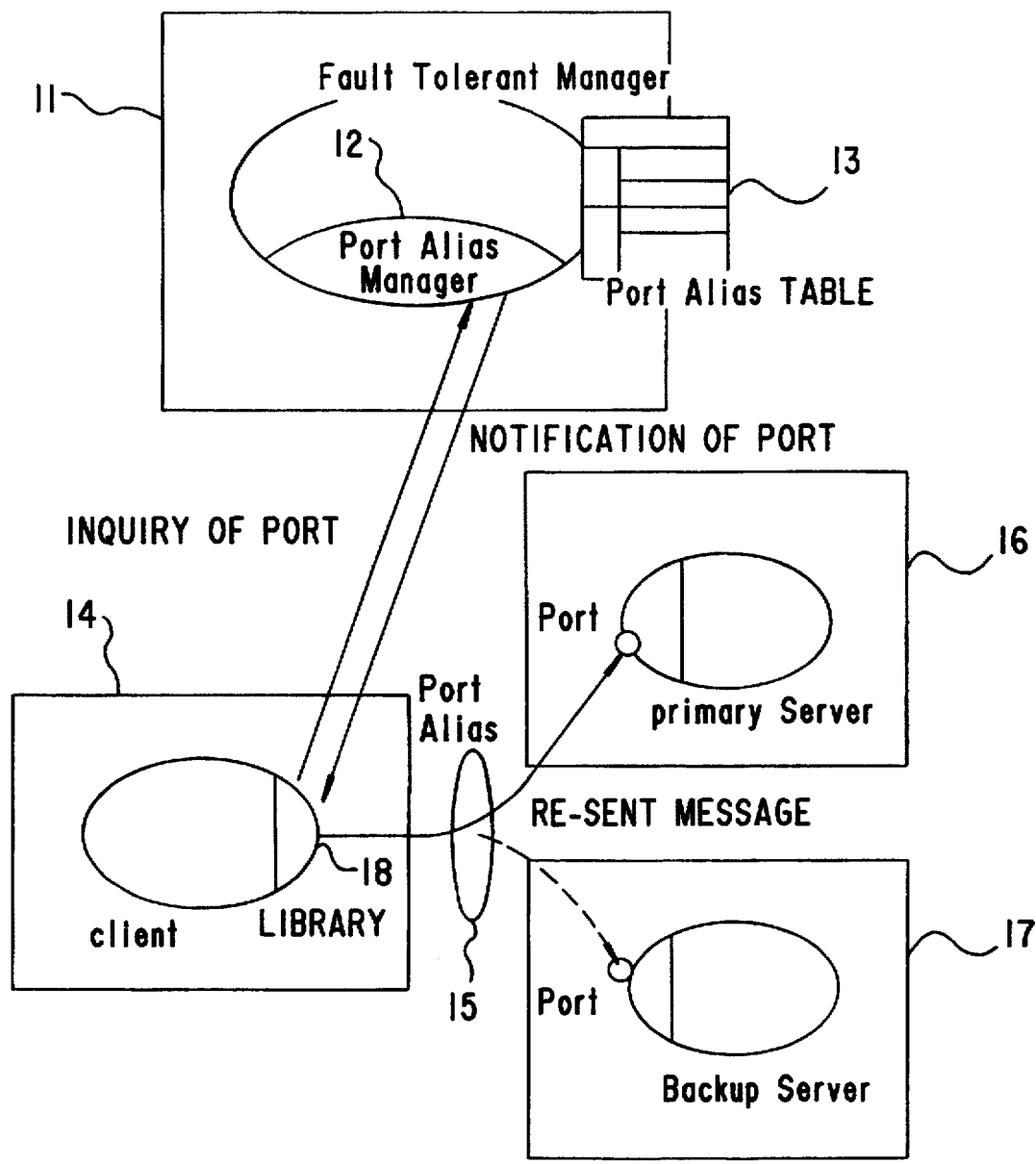
FIG. 3 is a schematic diagram showing an inter-process communication using a library.

FIG. 3 is a schematic diagram showing an example of a virtual inter-process communication with a library linked to a process on a system that only has a port and a port group as an inter-process communication system. In FIG. 3, the similar elements to those in FIG. 2 are denoted by the same reference numerals. An FTM 11 is disposed for each computer in which a process such as a client or a server is disposed. Thus, the number of FTMs 11 is the same as the number of computers. Thus, the number of the FTMs 11 is the same as the number of PAMs 12. These computers are connected by a network.

The PAM 12 has the above-described port alias table 13. When it is requested -that a message is sent from a client 14 to a port alias 15, a library 18 of the client 14 inquires the PAM 12 for the port alias 15 corresponding to the port group. Even if the library 18 inquires one of a plurality of PAMs on the network through the port group, since all the PAMs have the information of the port alias of the system, any PAM can answer the inquiry.

The PAM 12 searches for a port that is currently being used from among those included in the port alias 15 with the port alias table 13 corresponding to the inquiry. The PAM 12 returns the obtained port to the library 18. The library 18 sends a message to the port notified by the PAM 12 through the inter-process communication system.

For a preparation for re-sending a message to the same port alias, the library 18 can store a hint of the port thereof. When the library 18 has stored a hint, it sends a message to the receiver port corresponding to the hint, omitting the inquiry to the PAM 12. However, when the process of the receiver port corresponding to the hint has disappeared, the message cannot be successfully sent. In this case, the library 18 requests the PAM about the receiver port and re-sends the message to the port that newly provides the service.

In FIG. 3, in the case that the client 14 has sent a message to the port alias 15, the client 14 sends a message to the port corresponding to a hint stored in the library 18. However, when the process that provided the service has disappeared in the primary server 16 that has the port, the library 18 of the client 14 inquires the PAM 12 about the port and re-sends the message to the port of the backup server 17 that has a process that provides the service instead of the primary server 16.

FIG. 4 shows an example of the port alias table 13. The table shown in FIG. 4 stores a port alias identifier, an identifier of a registered port, an identifier of a registered process, and a mark representing a process that is providing a service.

In FIG. 4, two ports with registered port identifiers "PORT1" and "PORT2" are included in a port alias with a port alias identifier "PA1". Between them, the process having the port with the port identifier "PORT1" is currently providing a service.

FIG. 5 shows a redundantly sent message detecting system of a defect-free type RPC supporting system. In FIG. 5, a client 21 is composed of an SSC (server specific code) 22 for describing a main routine and a PALIB 23 that is a library called by the SSC 22. The client 21 has a port 24 and a port alias 25 in which the port 24 is included. A non-idempotent server 31 has an active server and a backup server that has the same function of the active server so as to accomplish the defect-free characteristic. In addition, the non-idempotent server 31 has a port alias 39 that is a common port of the active server and the backup server. The active server and the backup server share a stable area (SA) 35 that is a storage region that is not destroyed when a defect takes place in these servers so as to take over information each other. When a defect takes place in the active server, the backup server obtains information from the SA 35 so as to match the information of the active server and the information of the backup server.

The active server is composed of an SSC 32 and a PALIB 33 that is a library called from the SSC 32. The active server has a port 34 included in the port alias 39. On the other hand, the backup server is composed of an SSC 36 and a PALIB 37. The backup server has a port 38 included in the port alias 39.

The PALIB 23 of the client 21 and the PALIBs 33 and 37 of the server 31 function as the inter-process communication system and the redundantly sent message detecting system, and detect a redundantly sent message in the following manner. In the following description, the process of the port alias represents a process that the client or the server having the port alias performs.

When the client 21 sends an RPC message to the non-idempotent server 31, the PALIB 23 that is the communication system of the client 21 adds unique identifiers (ID) of RPC requests to all RPC messages and sends the resultant messages. As unique IDs, a combination of {srcAlias, srcPort, transId} or a combination of {srcAlias, incarnation, transId} is used. An ID added to an RPC message is stored in the SA 35 of the server 31 and used to identify a received message. srcAlias is an identifier that identifies a port alias of a sender. The srcAlias of a first sent message is the same as the srcAlias of the re-sent message. srcPort is an identifier of a port of a sender process of the first sending operation. incarnation is an incarnation number of an active process of the first sending operation. The incarnation number is a generation number that varies whenever the process of the active system is taken over by the process of the backup system. The incarnation number is managed by the FTM 11. The transId is a unique ID of an FT transaction. The transId of the first sending operation is the same as the transID of the re-sending operation. transId may be unique in each site, in each port alias, or in each process.

The user of the server 31 of the defect-free type RPC supporting system designates a desired operation to the port alias 39 when he or she receives an RPC redundant message that is being currently processed. For example, the user designates to the port alias 39 the content of a message that the port alias 39 automatically sends back to the user. The port alias 39 stores the message and uses it in a redundantly sent message detecting process (that will be described later). In addition, the user can cause the port alias 39 to call a redundantly sent message handler that is a function of a redundantly sent message process. At this point, the port alias 39 stores a startup parameter that is given whenever the redundantly sent message handler is called. The port alias 39 calls the redundantly sent message handler in the redundantly sent message detecting process corresponding to the parameter designated by the user.

Next, the redundantly sent message detecting process will be described. In an non-idempotent process, the active server notifies the PALIB 33 that a redundant process may be performed before a roll-back disable state takes place while the RPC is being processed. This operation is referred to as a notification of a roll forward point. The roll forward point is a specific point in the main routine of the SSC 32. When the process is performed exceeding the roll forward point, the former state cannot be restored. According to this notification, the PALIB 33 registers information representing that the roll forward point has been notified and information for detecting the redundantly sent message (ID of the message and so forth) to redundantly sent message process tables in the SA 35 or in other memory regions managed by the PALIB 33 and 37.

When a defect takes place in the active server before the notification of the roll forward point, since the process of the RPC performed in the active server has not been in the roll back disable state, a re-sent message performed by the re-sending system is not treated as a redundantly sent message. Thus, in a new active server, by simply re-executing a RPC request, the process is correctly continued. However, after the roll forward point has been notified, until the reply of the RPC is returned to the client 21, if a defect takes place in the client 21 or the server 31, the message resent by the re-sending system becomes a redundantly sent message.

The SSC 32 causes the PALIB 33 to perform a redundantly sent message process when the content of the process that is performed upon detection of a redundantly sent message is decided. The PALIBs 33 and 37 linked to processes of the active server and the backup server each compare the received RPC message with the information for detecting a redundantly sent message in the redundantly sent message process table, and check whether or not the roll forward point has been notified so as to determine whether or not the received message is a redundantly sent message. When a redundantly sent message is detected, a redundantly sent message process registered to the message by the process is activated.

In this case, after the process is performed exceeding the roll forward point of the main routine of the SSC 32, a defect takes place in the active server. Thus, the process of the active server is taken over by the backup server. The backup server detects a redundantly sent message by referencing the redundantly sent message process table in the SA 35 or in the other memory region managed by the PALIB 37, calls a pre-registered redundantly sent message process routine, and sends back the reply to the client 21.

For example, when a redundantly sent message is detected, the following two types of redundantly sent message processes can be designated.

The first example is an automatic result reply (AUTO REPLY) process. In this process, the port alias 39 automatically sends back a reply message registered by the server 31 to the client 21. When a process in reply to a redundantly sent message is registered, the SSC 32 also registers a reply message through the PALIB 33. The PALIB 33 changes the item of the related message of the redundantly sent message process table from a roll forward point notification completion state to an automatic result reply registration completion state. In addition, the PALIB 33 registers a reply message. When a redundantly sent message is detected, the registered message is automatically sent back to the client 21.

The second example is a redundantly sent message handler (redundant message handler) process. In this case, a redundantly sent message handler, that is a function called upon detection of a redundantly sent message, is designated for each message. When the server 31 detects a redundantly sent message, it calls a registered redundantly sent message handler. The SSC 32 registers a redundant handler calling process through the PALIB 33 when the process for the redundantly sent message is registered. The PALIB 33 changes the item of the related message of the redundantly sent message process table from the roll forward point notification completion state to the redundant handler registration completion state and registers an argument to be passed to the redundantly sent message handler. When the redundantly sent message is detected, the registered redundantly sent message handler is called with the argument. The called redundantly sent message handler re-calculates the result of the RPC process that has already been executed and securely sends back the reply to the client 21.

In this structure, since a server that performs a non-idempotent process can easily handle a redundantly sent message, the idempotency of the process can be secured.

FIG. 6 shows an example of an automatic re-sending operation of an RPC request and a redundantly sent message detection in the case that an active server shown in FIG. 5 exceeds a roll forward point and a defect takes place therein. In FIG. 6, a PALIB 23 of a client 21 adds an ID {srcAlias, srcPort, transId} to a message and sends the resultant message to a port alias 39 of a server 31. srcAlias and srcPort represent a port alias 25 and an identifier of a port 24, respectively. At this point, the active server registers the ID of the received message to a redundantly sent message process table in an SA 35 or in another memory region managed by the PALIB 23.

When the redundantly sent message process is an automatic result replying process, the defect-free type RPC supporting system performs the following operation.

(1) The active server notifies the roll forward point. When the probability of a redundantly sent message takes place, the active server registers an automatic reply message that is sent back upon detection of a redundant detection to the redundantly sent message process table.

(2) After a defect takes place in the active server, the port alias 25 detects the defect thereof and automatically re-sends the request message.

(3) A PALIB 37 of a backup server (new active server), that has taken over the process of the active server, compares {srcAlias, srcPort, transId} of the automatically re-sent request message with those stored in the SA 35 and determines that the request message is a redundantly sent message.

(4) The port alias 39 automatically sends back the reply message that has been registered by the defective server (previous active server) to the client 21.

When the redundantly sent message process is a redundantly sent message handler process, the defect-free type RPC supporting system performs the following operation.

(1) At a roll forward point, an active server selects a function to be activated in a redundantly sent message process and an argument passed to the function upon activation of the function from a redundantly sent message handler array composed of a plurality of functions, and registers the selected function and argument.

(2) After a defect takes place in the active server, the port alias 25 detects the defect thereof and automatically re-sends the request message.

(3) A PALIB 37 of a new active server compares {srcAlias, srcPort, transId} of the automatically re-sent request message with those stored in the SA 35, and determines that the request message is a redundantly re-sent message.

(4) The port alias 39 calls the redundantly sent message handler that the previous active server has registered.

(5) The redundantly sent message handler of the server recalculates a message for sending the process result of the previous active server and sends back the result as a reply message to the client 21.

In the above examples, the redundantly sent message process in the case that a defect takes place in the server was described. However, when a defect takes place in a client, a redundantly sent message may be detected.

Figure 7:
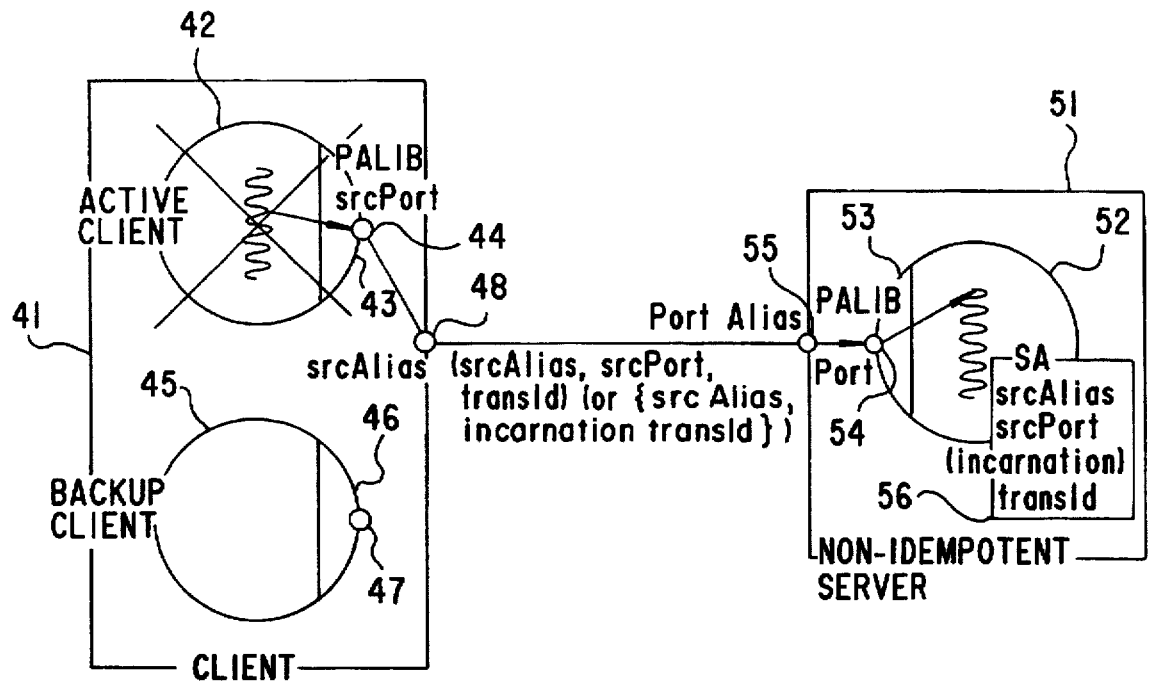
FIG. 7 is a schematic diagram showing a manual re-sending operation upon occurrence of a defect in a client.

FIG. 7 shows an example of manual re-sending operation of RPC request and a redundantly sent message detection in the case that a saver exceeds a roll forward point and a detect take place a client.

In FIG. 7, a client 41 has an active client and a backup client that has the same function as the active client so as to accomplish the defect-free characteristic. In addition, the client 41 has a port alias 48 that is a common port of the active client and the backup client. The active client is composed of an SSC 42 and a PALIB 43 that is a library called from the SSC 42. The active client has a port 44 included in the port alias 48. On the other hand, the backup client is composed of an SSC 45 and a PALIB 46. In addition, the backup client has a port 47 included in the port alias 48. A non-idempotent server 51 is composed of an SSC 52 and a PALIB 53. The non-idempotent server 51 has a stable area (SA) 56, a port 54, and a port alias 55. The port 54 is included in the port alias 55.

The PALIB 43 of the active client adds ID {srcAlias, srcPort, transId} or {srcAlias, incarnation, transId} to a message and sends the resultant message to a server 51. srcAlias and srcPort represent identifiers of the port alias 48 and the port 44, respectively. incarnation represents an incarnation number of a message. At this point, the server 51 registers the ID of the message to a redundantly sent message process table in the SA 56 or in another memory region managed by PALIB 53.

When the identifier (srcPort) of the sender port is sent along with a message, the defect-free type RPC supporting system performs the following operation.

(1) After a defect takes place in the active client, the backup client becomes a new active client and manually re-sends a request message. At this point, srcPort that is sent along with the re-sent message is the same as srcPort of the first message sent by the previous active client.

(2) The PALIB 53 of the server 51 compares {srcAlias, srcPort, transId} of the re-sent request message with those stored in the SA 56, and determines that the request message is a redundantly sent message.

(3) The port alias 55 performs a redundantly sent message process for automatically sending back the result or for calling a redundantly sent message handler and sends back a reply message to the port alias 48 of the client 41.

When an incarnation number of a message is sent along with the message, the defect-free type RPC supporting system performs the following operation.

(1) After a defect takes place in the active client, the backup client becomes a new active client and manually re-sends a request message. At this point, incarnation that is sent along with the re-sent message is the same as incarnation of the first message sent by the previous active client.

(2) The PALIB 53 of the server 51 compares {srcAlias, incarnation, transId} of the re-sent request message with those stored in the SA 56 and determines that the request message is a redundantly sent message.

(3) The port alias 55 performs the redundantly sent message process for automatically sending back the result or for calling a redundantly sent message handler and sends back a reply message to the port alias 48 of the client 41.

Next, with reference to FIGS. 8 to 13, the process of the PALIB will be described in detail.

Figure 8:
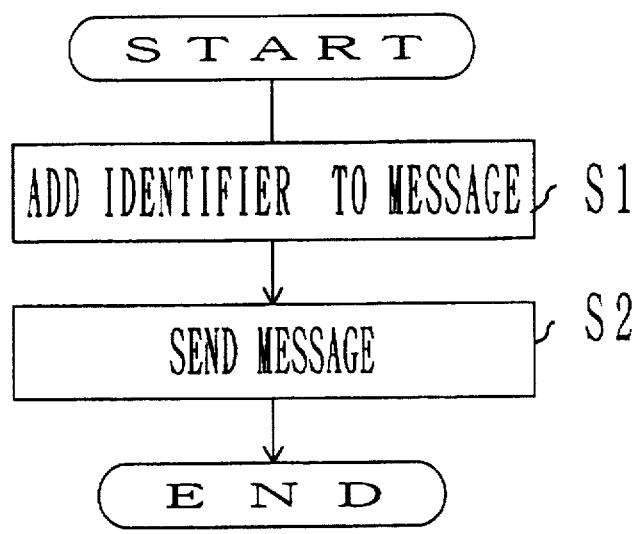
FIG. 8 is a flow chart showing a library process performed on the client side.

FIG. 8 is a flow chart showing a process of a PALIB called from a main routine when a client sends a request message. In FIG. 8, when the process is started, the PALIB adds an identifier to a request message (at step S1) and sends the request message to the server corresponding to an RPC request function (at step S2). As a result, the process is completed.

FIG. 9 shows a pseudo code of the PALIB on the client side. In FIG. 9, PA_Call is called with arguments of a sender address, a receiver address, and a message to be sent. After the value of a transaction counter is set to message_ID, the transaction counter is incremented. Thereafter, srcPort and message_ID are added to the message to be sent. With ipcCall, the resultant message is sent. message_ID is used as the above-described transId.

FIG. 10 shows a pseudo code of the message receiving process performed by the SSC on the server side. In FIG. 10, serverMainLoop is a loop process performed after the server has been initialized. In the loop process, the server calls PA_Receive with an argument of a service request (request) and then calls a process function such as file_delete (delation of file) or file_create (creation of file) corresponding to the type of the request. When the request content is the delation of a file (request.operand==FILE_DELETE), calls a function file_delete and deletes the file. The result is sent back as a message reply to the client with ipcReply. Processes of PA_blockRequest and PA_setRedProcess called by file_delete will be described later.

Figure 11:
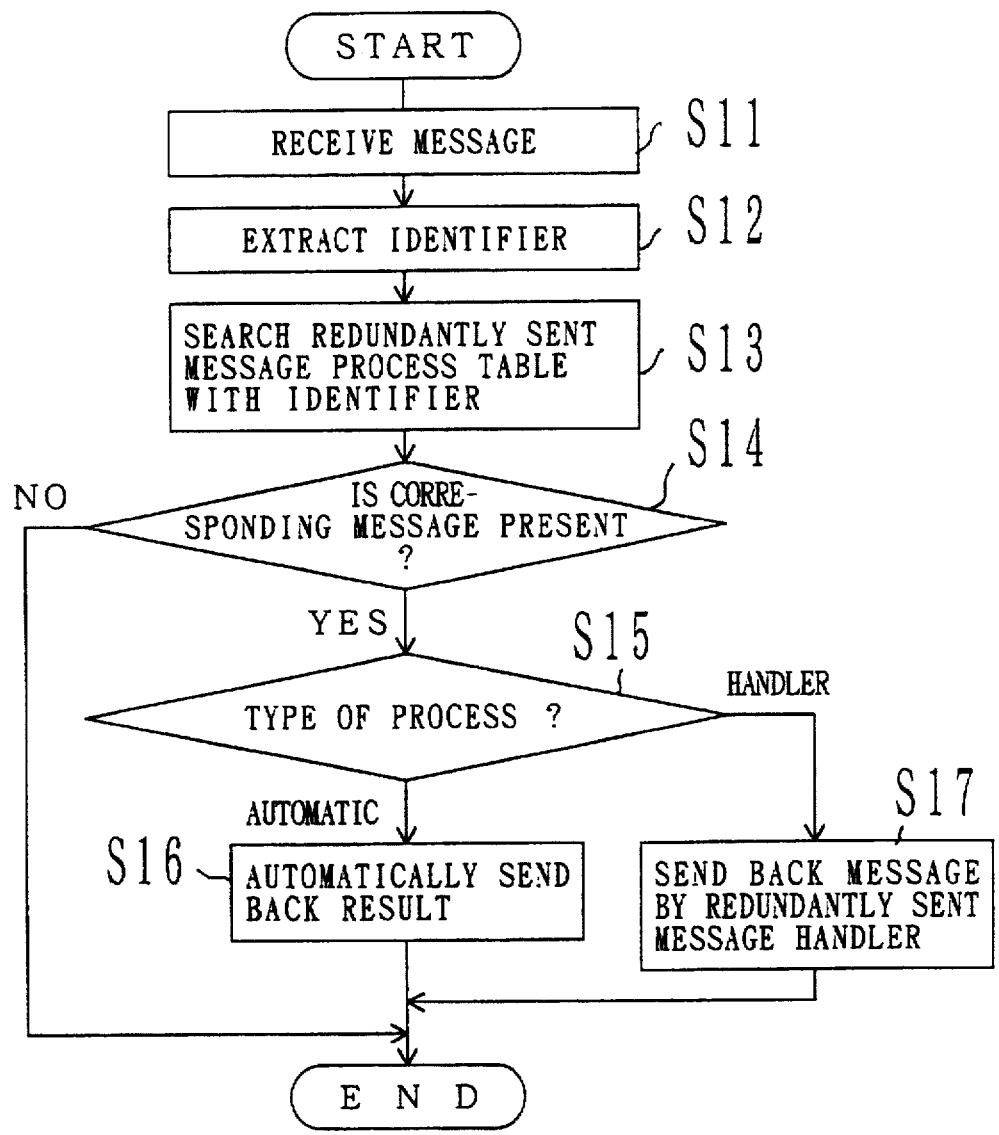
FIG. 11 is a flow chart showing a library process on the server side.

FIG. 11 is a flow chart showing a process of a PALIB equivalent to PA_Receive called from the main routine of a server.

In FIG. 11, when the process is started, the PALIB receives a request message (at step S11) and extracts an identifier from the received message (at step S12). Thereafter, the PALIB searches a redundantly sent message process table with the extracted identifier (at step S13) and determines whether or not a message with the same identifier has been registered (at step S14). When the same identifier is not detected, it is determined that the received message is not a redundantly sent message. As a result, the process is completed. When the same identifier is detected, it is determined that the received message is a redundantly sent message, and checks the type of the registered redundantly sent message process (at step S15). Corresponding to the type of the process, the automatic result reply process (at step S16) or the redundantly sent message handler process (at step S17) is performed. As a result, the process is completed. FIG. 12 shows a pseudo code of the PALIB on the server side. In FIG. 12, PA_receive is called from an SSC with an argument of a received message (message). With PA_receive, a loop process is performed. In the loop process, the PALIB extracts identifiers srcPort and message_ID from the received message and searches a redundantly sent message process table in the SA with these identifiers. The searched result of whether or not the same identifier has been found is set to rslt. When rslt represents that the same identifier has been found, the type of the process upon detection of a redundantly sent message is read from the redundantly sent message process table and set to process_type.

When process_type represents the automatic result reply process, the content of the reply message is copied from the redundantly sent message process table to reply. ipcReply sends back reply and the process returns to the top of the loop. When process_type represents calling the redundantly sent message handler, the pointer of the registered handler function is set to function. Data (parameter) given from the redundantly sent message process table to the function is copied to arg. Next, with arguments of arg, message, and reply, a function represented by function is called. A corresponding reply message is generated and stored in reply. ipcReply sends back the reply. Thus, the process returns to the top of the loop. When rslt does not represent the detection of a redundantly sent message, the loop process is completed.

FIG. 13 shows a pseudo code of the PALIB of a registering process called from the SSC shown in FIG. 10. The PALIB shown in FIG. 13 is called in a process performed corresponding to a request received from the client. In FIG. 13, PA_blockRequest is called when a process that may result in the redundantly sent message process is executed. If the process is the execution of the re-sending request, since the process should be taken over, PA block Request registers temporarily stopping the execution of the process as the registered block process to an identifier in the redundantly sent message process table. Thus, the registered block process for requesting the re-sending of the request message is executed. The re-sending process of the message with the identifier is temporarily stopped.

PA_setRedProcess is called, for example, when the requested process is completed, and registers in an identifier corresponding to the process, information for detecting a redundantly sent message and a process performed upon detection of the redundantly sent message. At this point, the identifier extracted from the received message and the type (AUTO_REPLY or REDUNDANT_MESSAGE_HANDLER) representing the type of the redundantly sent message process is written to the redundantly sent message process table. When type is AUTO_REPLY, a reply message that is automatically sent back is written as reply data. When type is REDUNDANT_MESSAGE_HANDLER, data given to the redundant handler is written as arg data. When the block has been registered with PA_blockRequest, it is erased.

Information registered in the redundantly sent message process table is referenced by PA_receive shown in FIG. 12 when the re-sent message is received.

Next, with reference to FIGS. 14 to 18, the case that a processing portion (client), that requests a service communicates with a processing portion (server) that provides a service through a relay processing portion, will be described. In this case, information for matching information relayed by the relay processing portion and information relayed by a substitute relay processing portion is stored. Thus, when the system is restored from a defect, the substitute relay processing portion uses the stored information.

Figure 14:
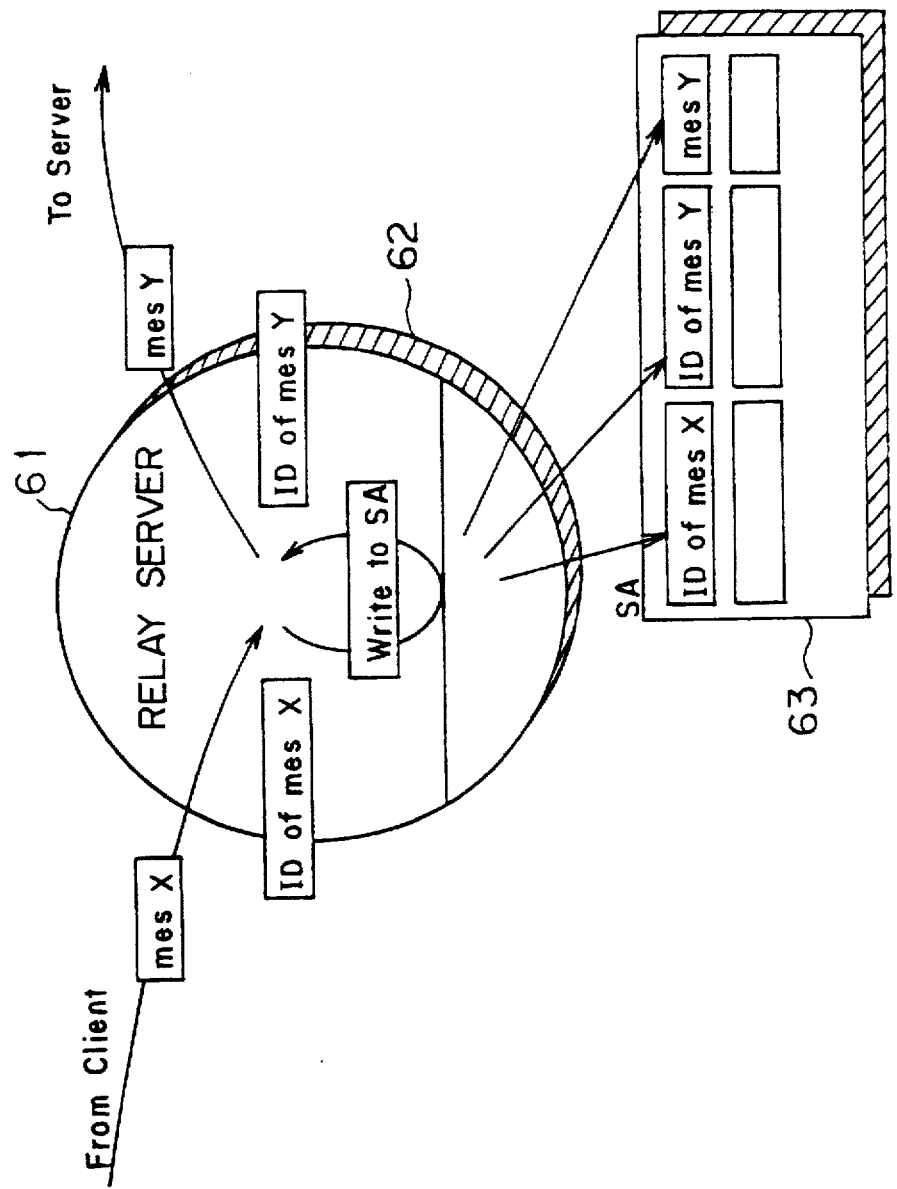
FIG. 14 is a schematic diagram showing a writing operation of an identifier by a relay server.
Figure 15:
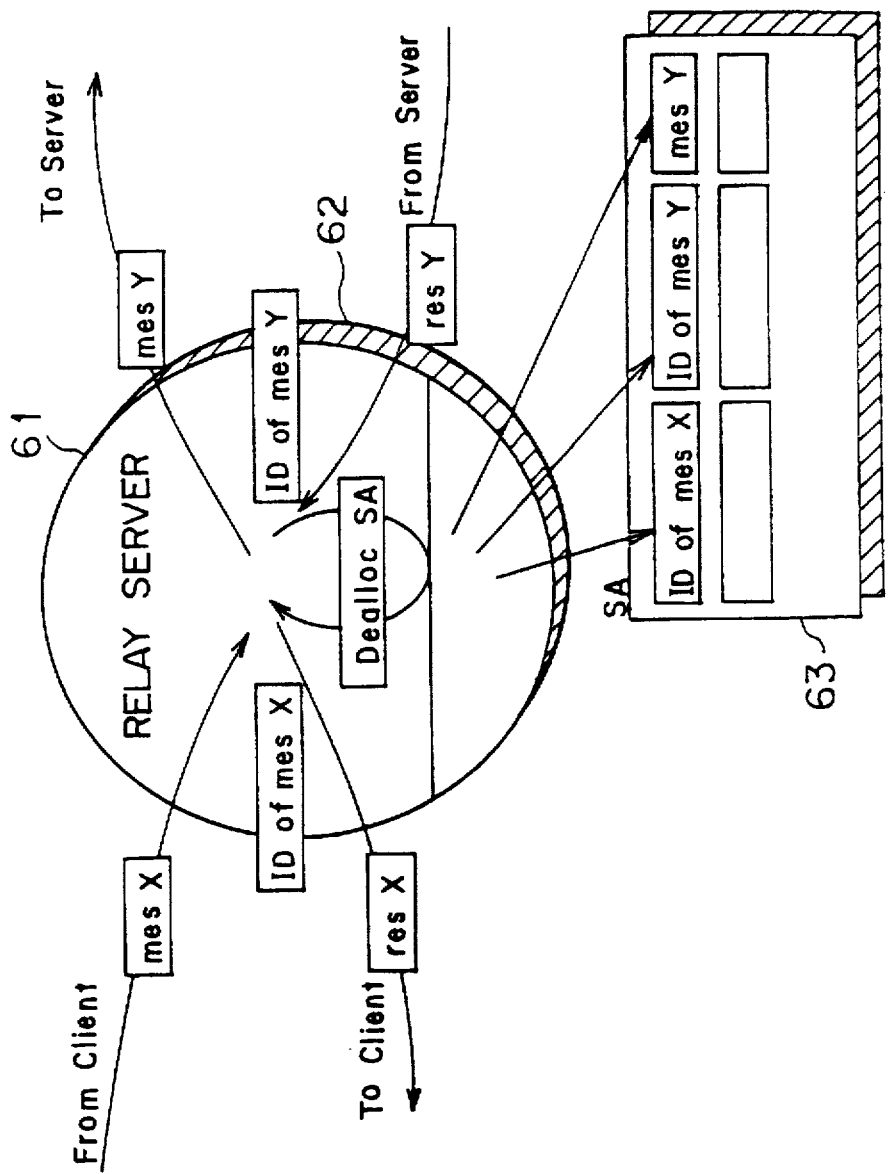
FIG. 15 is a schematic diagram showing a transferring operation of a reply message by the relay server.
Figure 16:
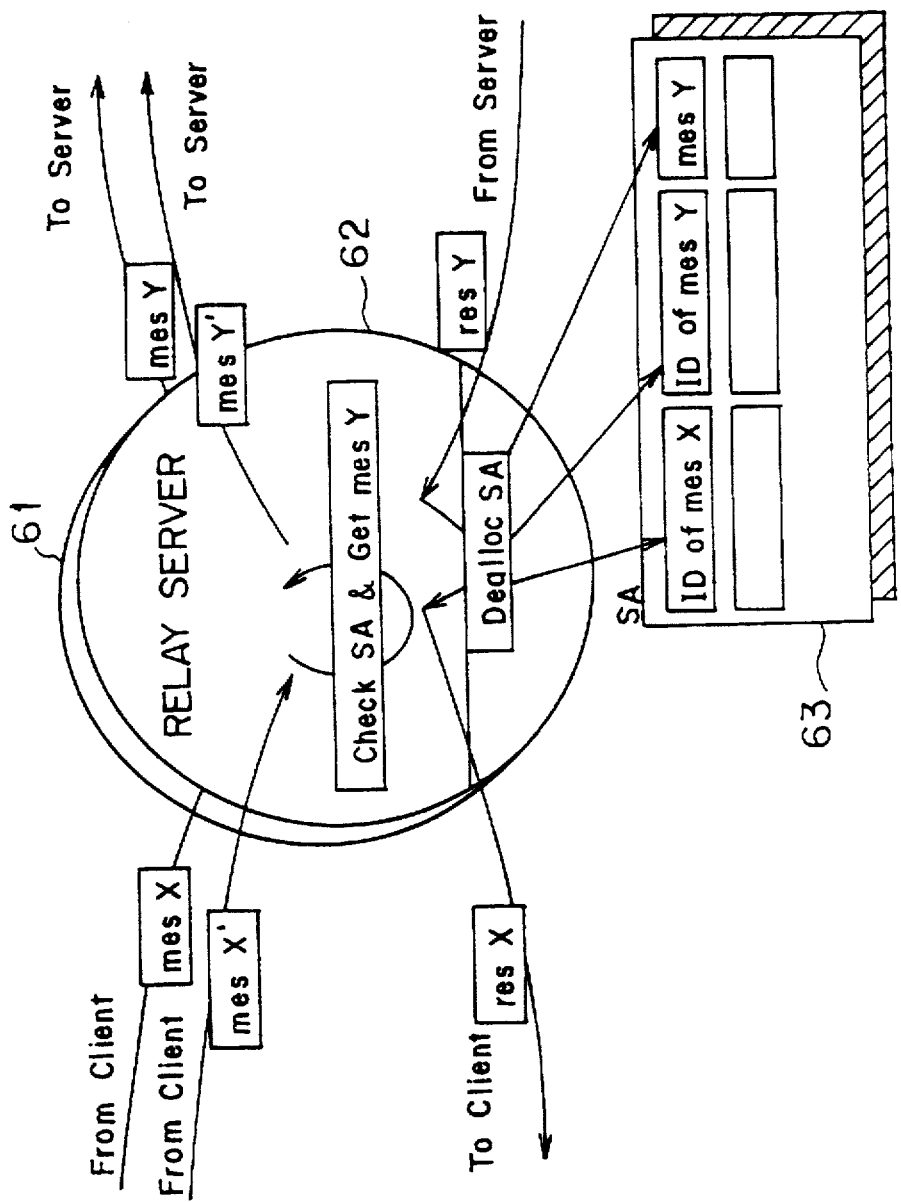
FIG. 16 is a schematic diagram showing a process in the case that a redundantly sent message is detected by the relay server.

FIGS. 14, 15, and 16 show operations of a relay server that relays requests from a client to a server.

To accomplish the defect-free characteristic, each process portions that are a client, a server, and a relay server, have backup process portions (backup portions) that have the same functions as the active portions. The active portion and the backup portion share an SA (stable area) that is not destroyed even if a defect takes place in the active portion and the backup portion, so as to take over information therebetween. Each processing portion, such as the client, the server, and the relay server, has the above-described redundantly sent message detecting system. When a defect takes place in the active portion, the backup portion obtains information from the SA so as to have the matching characteristic in the restoring process.

The relay server of the active portion writes and stores to the SA a list of a combination of a message ID of a message received from the client and a message ID of a message sent to the server. The list may include the message sent to the server. ID is an identifier that is uniquely designated in a communication that is sent or received. The message ID received from the client is an ID that the client adds to the message so that the redundantly sent message detecting system determines a message re-sent from the client. The message ID to the server is an ID that the relay server adds to the message so that the backup portion can send the same message when a defect takes place in the active system.

In FIG. 14, the relay server 61 of the active portion receives a message mes X from the client and sends a message mes Y corresponding to the message mes X to the server. At this point, the relay server 61 writes the ID of the mes X, the ID of the mes Y, and the mes Y itself to a SA 63. In addition, the relay server 61 sets a process flag (not shown) of the mes X in the SA 63 to "processing".

As shown in FIG. 15, in the normal operation, when the relay server 61 receives a reply message res Y from the server, the reply server 61 sends back a message res X corresponding to the message res Y to the client. In addition, the relay server 61 changes the state of a process flag of the mes X to "completed".

As shown in FIG. 16, when a defect takes place in the relay server 61, the list in the SA 63 is taken over by a backup relay server 62. The new relay server 62 checks the process flags of the list in the SA 63. When the relay server 62 has found a transaction that has not been completed, it sends the message ID and the message stored in the SA 63 to the server. In addition, the SSC of the relay server 62 can designate another relay message and send it to the server. Alternatively, if necessary, the relay server 62 can generate a new relay message. At this point, the server and the client perform the following operations.

The redundantly sent message detecting system of the server maintains the matching characteristic of the processes and sends back a precise reply to the relay server 62. The relay server 62 calculates the result corresponding to the received value and stores it as data of the redundantly sent message detecting system.

The client detects that a message has not been sent back and re-sends the request message.

The relay server 62 receives the re-sent message from the client. Since the message ID in the SA 63 is the same as the re-sent message ID, the redundantly sent message detecting system determines that the received message is a redundantly sent message. When the server has replied to a message, the relay server 62 can correctly send it back. When the server has not replied to a message, the relay server 62 waits for the reply from the server. When the relay server 62 has received the reply from the server and calculated a message to be sent back, the relay server 62 sends back the calculated message to the client. In addition, the relay server 62 changes the state of the corresponding process flag to "completed".

In FIG. 16, when the relay server 62 receives from the client a re-sent message mes X' with the same ID as the mes X, it checks the information in the SA 63. The relay server 62 extracts the mes Y that is stored along with the ID from the SA and sends it as a mes Y' to the server. When the relay server 62 receives a reply message res Y, it sends it as a res X to the client.

Thus, in the restoring process performed upon occurrence of a defect in the relay system, the matching characteristic is assured. Consequently, the process for the fault can be concealed in the communication system.

FIGS. 17A, 17B, 18A, 18B, and 18C show examples of the defect-free system according to the present invention. The defect-free system is composed of a process A that is a client, a process B that is an active system of a relay server, a process B' that is a backup system of the process B, and a process C that is a server.

As shown in FIG. 17, in the normal operation, communications are performed in the following sequence.

Figure 17A:
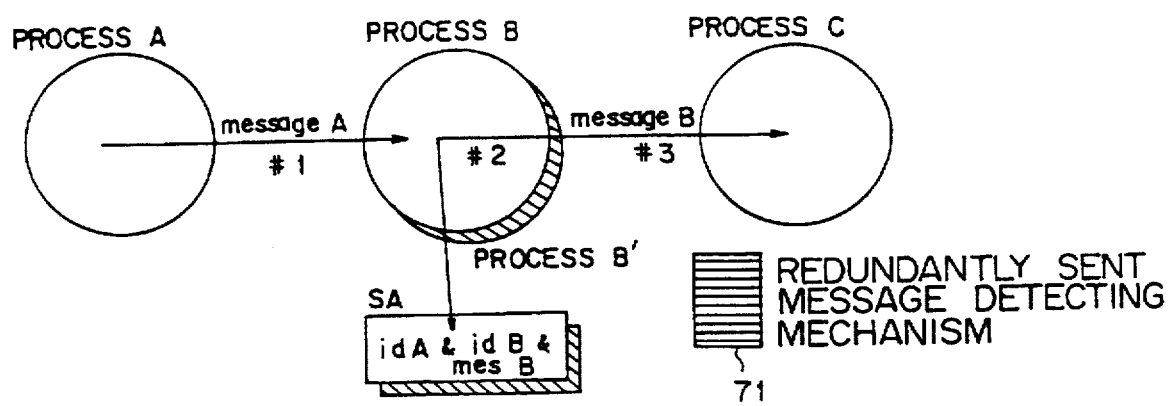
FIGS. 17A and 17B are schematic diagrams showing an operation in the normal state of the relay server.

1 The process A sends a message A to the process B (see FIG. 17A).

2 The process B writes required information (representing that the message A is being relayed) to the SA (see FIG. 17A). At this point, idA that is the ID of the message A, idB that is the ID of the message B to be sent to the process C, and the message B are recorded in the SA.

3 The process B sends the message B to the process C (see FIG. 17A).

4 After the process C executes a service, the process C registers the redundantly sent message process to an SA (not shown) of the process C with the redundantly sent message detecting system 71. Thereafter, the process C sends a reply message res B to the process B (see FIG. 17B).

Figure 17B:
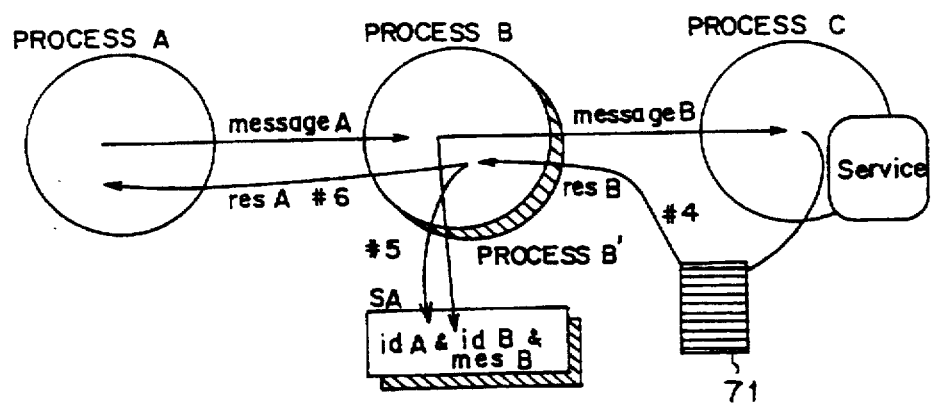

5 The process B registers the redundantly sent message process to the SA (see FIG. 17B).

6 The process B sends a reply message res A to the process A (see FIG. 17B).

When a defect takes place in the process B, which is the relay server, the backup process B' performs the defect restoring process with the information in the SA. This process is performed in the following sequence as shown in FIG. 18.

The steps #1 to #4 are the same as those shown in FIG. 17. Now, assume that when the process C has completed a service, a defect takes place in the process B (see FIG. 18A).

Figure 18A:
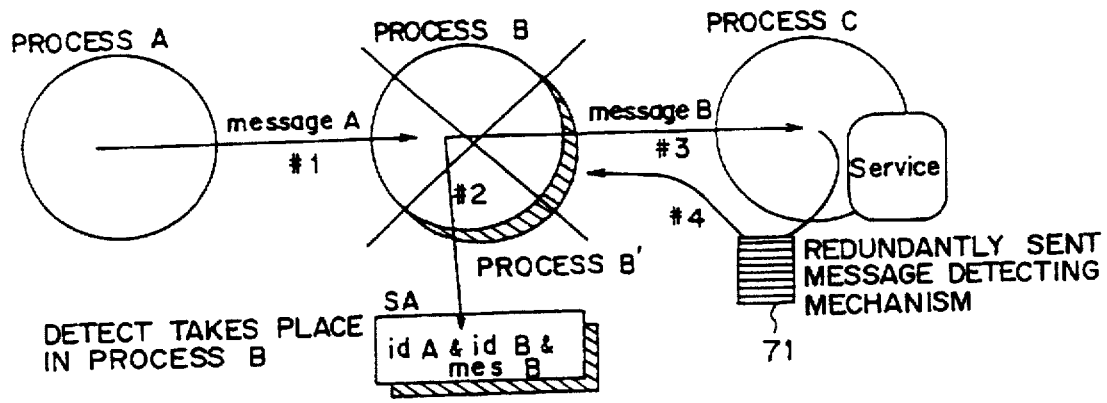
FIGS. 18A, 18B, and 18C are schematic diagrams showing an operation in the case that a defect takes place in the relay server.
Figure 18B:
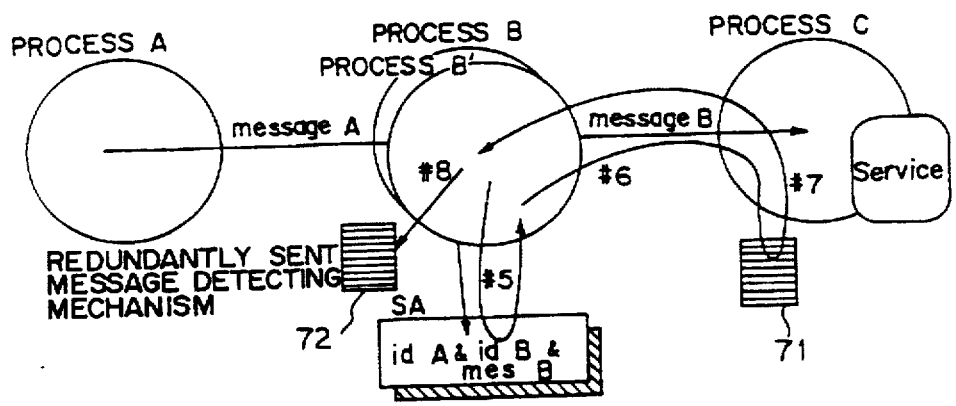
Figure 18C:
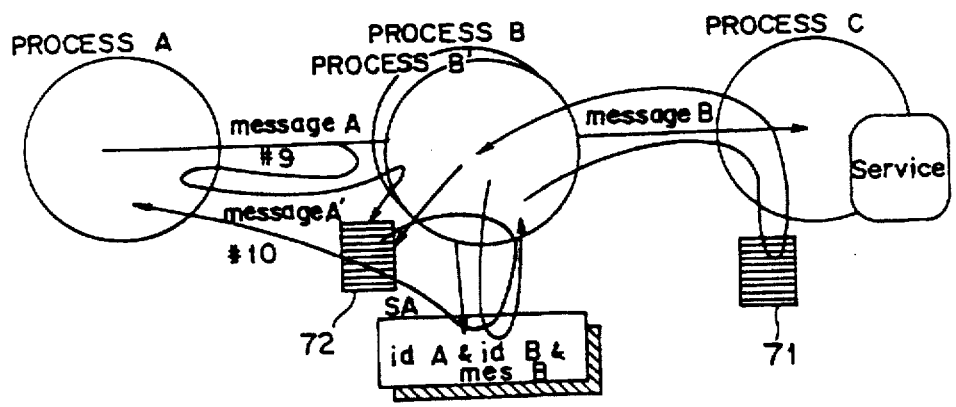

5 The process B' that has taken over the process of the process B checks the information in the SA and searches a transaction that has not been completed (see FIG. 18B).

6 When the process B' has found a transaction that has not been completed, the process B' requests the process C for the service with the same ID as the message B and the same message (see FIG. 18B).

7 The redundantly sent message detecting system 71 of the process C detects that the process B' has sent the same information as the message B, executes the process performed upon detection of a redundantly sent message, and sends back a reply message reply to the process B' (see FIG. 18B).

8 The process B' notifies the reply of the process C to the redundantly sent message detecting system 72 (see FIG. 18B).

9 The process A sends the re-sent message A' to the process B'. The redundantly sent message detecting system 72 of the process B' detects that the message A' is a re-sent message of the message A (see FIG. 18C).

10 The redundantly sent message detecting system 72 references the SA. When the SA has a reply message from the process C, the redundantly sent message detecting system 72 sends the reply message to the process A (see FIG. 18C).

However, in a distribution system, the order of processes is not assured. Thus, the processes are not always performed in the above-described sequence. It is assumed that the execution order of these processes is synchronized by the redundantly sent message detecting system. For example, the redundantly sent message detecting system 71 does not send a reply to the process B' until the service of the process C is completed. Likewise, the redundantly sent message detecting system 72 does not send a reply to the process A until the redundantly sent message detecting system 72 receives a reply from the process C.

When a message re-sent from the process A arrives earlier than a reply message from the process C, the following operation is performed.

The steps #1 to #4 are the same as those shown in FIG. 18A. Now, assume that when the process has been completed, a defect takes place in the process B.

5 The process A re-sends a message A' to the process B'. The redundantly sent message detecting system 72 of the process B' detects that the message A' is a re-sent message of the message A. However, since information in which the process of the message A should be taken over by the process B' has been registered in the SA, the sending operation of the message A' is temporarily stopped. The block registration for temporarily stopping the re-sending operation of the message is performed by, for example, the library PA_blockRequest shown in FIG. 13.

6 The block B' checks the information in the SA and finds a transaction that has not been completed.

7 The process B' requests the process C for a service with the same ID as the message B and the same message.

8 The redundantly sent message detecting system 71 of the process C detects that the process B' has sent the same information as the message B. After the redundantly sent message detecting system 71 executes a process performed upon detection of a redundantly sent message, it sends back a message reply to the process B'.

9 The process B' notifies the reply of the process C to the redundantly sent message detecting system 72.

10 The redundantly sent message detecting system 72 cancels the block registration in the SA and resumes the process of the message A' from the step of detecting a redundantly sent message. At this point, the redundantly sent message detecting system 72 detects the re-sent message of the message A and sends the registered reply to the process A.

In the above example, the restoring process corresponding to the roll forward method was described. In the case of a transaction in which a process executed by the server is restored, the restoring process corresponding to the roll back method may be performed. To do that, a process that is being performed by the process B and a process that has been temporarily executed by the process C should be restored to the former state. In this case, the following operation is performed.

The steps #1 to #4 are the same as those shown in FIG. 18A. Now, assume that when the process C has completed a service, a defect takes place in the process B.

5 The process B' checks information in the SA and searches a transaction that has not been completed.

6 When the process B' has found a transaction that has not been completed, the process B' requests the process C to restore a process that the process B has requested before a defect took place in the process B, to the state before the process had been executed.

7 The process B' changes the state of the process flag in the SA, that represents that the SSC corresponding to the transaction is executing, from "executing" to, for example, "completed", and cancels the relay process. Thus, the process in the SSC is rolled back.

8 The process C restores the executed process to the former state, deletes the redundantly sent message process registered in the SA of the process C, and cancels it.

9 When the process A automatically re-sends a message, the process B performs the process from the beginning as with the normal operation corresponding to the re-sent request message.

In the above-described embodiment, each processing portion such as a client and a server is assigned to each independent computer. These computers are mutually connected by a network.

Figure 19:
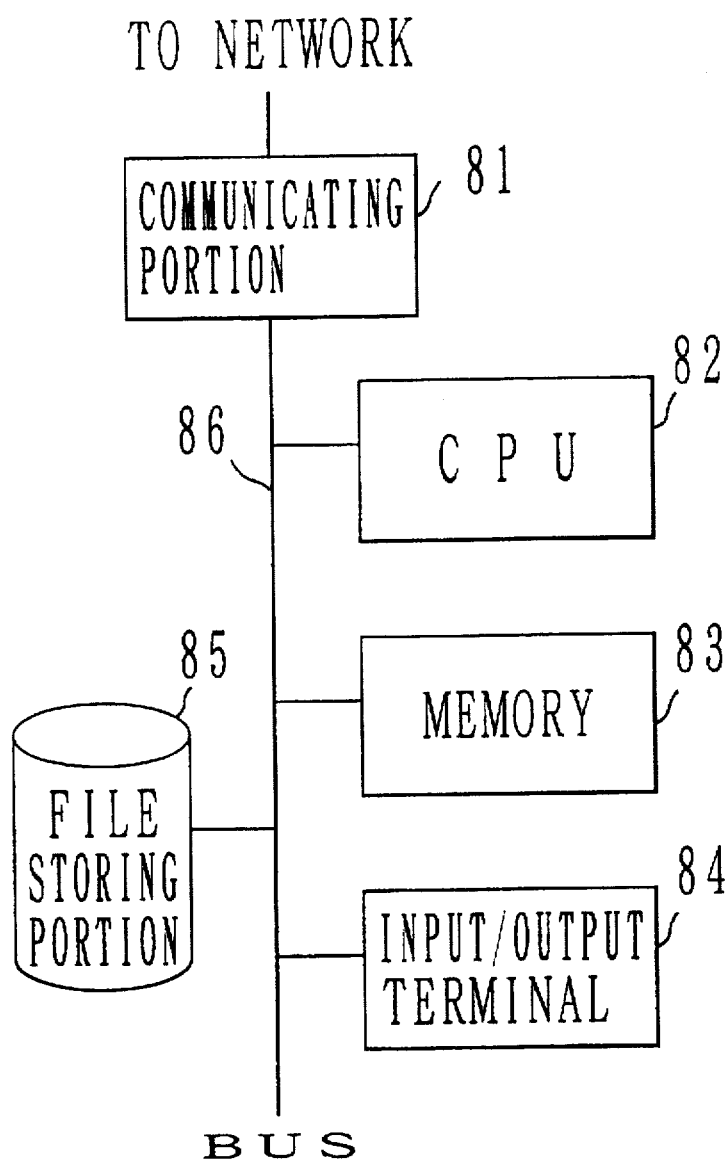
FIG. 19 is a schematic diagram showing a hardware structure of a computer.

FIG. 19 shows an example of a hardware structure of each computer. The computer shown in FIG. 19 comprises a communicating portion 81, a CPU (central processing unit) 82, a memory 83, an input/output terminal 84, and a file storing portion 85. These portions are connected by a bus 86. The CPU 82 generates a process having a required function with the memory 83 and communicates with a process of another computer through the communicating portion 81. The input/output terminal 84 is a display terminal or the like that accomplishes a user interface. The file storing portion 85 is a storing device such as a hard disc device.

With a multi-process function on one computer, a plurality of processes can be generated. The functions of processing portions can be assigned to the processes. In this case, communications are performed among processes of the computer without need to use the network.

According to the present invention, after an RPC request is issued in a highly available computer system, when a defect takes place in hardware or software, a request message can be easily re-sent and a correct reply message can be sent back. In particular, with a server that performs an non-idempotent process, a message redundantly sent from the client can be handled. In addition, in the case that a relay processing system is disposed in a distribution system, when a defect takes place therein, a normal operation state can be restored.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A defect-free type remote procedure call system for use in a defect-free type communications system in which a first process requests a second process for a service through a communication network and the second process sends back the result of the request to the first process, comprising:

port managing means for managing the relation of a port set identifier of a set of ports for a set of processes that send request messages and port identifiers of ports of the processes of the set;

identifier adding means for automatically adding identification information including the same port set identifier to a first sent message and a re-sent message of each request message; and sending means for sending the request message with the identification information from the first process to the second process.

2. The defect-free type remote procedure call system as set forth in claim 1, wherein said identifier adding means has a library for automatically adding the identification information to each request message and is adapted for calling the library when the request message is sent.

3. The defect-free type remote procedure call system as set forth in claim 1, wherein said identifier adding means is adapted for adding the same port identifier as the identification information.

4. The defect-free type remote procedure call system as set forth in claim 3, wherein said identifier adding means is adapted for adding the same transaction identifier as the identification information.

5. The defect-free type remote procedure call system as set forth in claim 4, wherein said identifier adding means has a unique identifier for each process as the transaction identifier.

6. The defect-free type remote procedure call system as set forth in claim 4, wherein said identifier adding means has a unique identifier for each port set as the transaction identifier.

7. The defect-free type remote procedure call system as set forth in claim 4, wherein said identifier adding means has a unique identifier for each site as the transaction identifier.

8. The defect-free type remote procedure call system as set forth in claim 1, wherein said identifier adding means is adapted for adding the same incarnation number as the identification information.

9. The defect-free type remote procedure call system as set forth in claim 1, further comprising:

detecting means for receiving the request message, checking the identification information added to the request message, and automatically detecting whether the request message is a redundantly re-sent message; and replying means for performing a redundantly sent message process and sending back the result of the process executed by the second process to the first process when said detecting means has detected a redundantly re-sent message.

10. The defect-free type remote procedure call system as set forth in claim 1, further comprising:

first storing means for storing a redundantly sent message process table that registers identification information of a received first request message and preventing the stored content from being lost when a defect takes place in the first process or the second process, wherein said detecting means is adapted for determining that a second request message is a redundantly re-sent message when identification information of the second request message received after the first request message accords with identification information registered in the redundantly sent message process table.

11. The defect-free type remote procedure call system as set forth in claim 1, wherein a backup process that takes over an active process upon occurrence of a defect of the first process or the second process, has the same port set identifier as the active process.

12. The defect-free type remote procedure call system as set forth in claim 1, wherein said sending means is adapted for sending the request message to a port corresponding to the relation of the port set identifier of the identification information, the port set identifier managed by said port managing means, and the port identifier.

13. A defect-free type remote procedure call system for use in a defect-free type communications system of which a first process requests a second process for a service through a communication network and the second process sends back the result of the request to the first process, comprising:

detecting means for receiving a request message with identification information including a port set identifier of a set of ports for a set of processes, checking the identification information, and automatically detecting whether or not the request message is a redundantly re-sent message; and replying means for performing a redundantly sent message process and sending back the result of the process executed by the second process to the first process when said detecting means detects a redundantly re-sent message.

14. The defect-free type remote procedure call system as set forth in claim 13,
wherein said detecting means has a library for automatically detecting whether or not the request message is a redundantly re-sent message corresponding to the identification information and is adapted for calling the library when the request message is received.

15. The defect-free type remote procedure call system as set forth in claim 13,
wherein said replying means is adapted for sending back a predetermined reply message to the first process when a redundantly re-sent message is detected.

16. The defect-free type remote procedure call system as set forth in claim 13,
wherein said replying means is adapted for calling a function, generating a reply message, and sending back the reply message to the first process when a redundantly re-sent message is detected.

17. The defect-free type remote procedure call system as set forth in claim 13,
wherein said replying means is adapted for selecting an automatic replying process for sending back a predetermined reply message to the first process or a reply generating process for calling a function, generating a reply message, and sending back the reply message to the first process and for performing the selected redundantly sent message process when a redundantly re-sent message is detected.

18. The defect-free type remote procedure call system as set forth in claim 13, further comprising:
first storing means for storing a redundantly sent message process table that registers identification information of a received first request message and preventing the store content from being lost when a defect takes place in the first process or the second process,
wherein said detecting means is adapted for determining that a second request message is a redundantly re-sent message when identification information of the second request message received after the first request message accords with the identification information registered in the redundantly sent message process table.

19. The defect-free type remote procedure call system as set forth in claim 18,
wherein said first storing means is adapted for registering an automatic replying process as the redundantly sent message process to the redundantly sent message process table and storing a reply message replied by the automatic replying process, and
wherein said replying means is adapted for sending back the reply message stored in said first storing means to the first process when a redundantly re-sent message is detected.

20. The defect-free type remote procedure call system as set forth in claim 18,
wherein said first storing means is adapted for registering a reply generating process as the redundantly sent message process in the redundantly sent message process table, and
wherein said replying means is adapted for generating a reply message by the reply generating process and sending back the reply message to the first process when a redundantly re-sent message is detected.

21. The defect-free type remote procedure call system as set forth in claim 18,
wherein said first storing means is adapted for storing a parameter given to the reply generating process, and
wherein said replying means is adapted for generating the reply message with the parameter stored in said first storing means when a redundantly re-sent message is detected.

22. The defect-free type remote procedure call system as set forth in claim 13,
wherein said detecting means is adapted for receiving the request message with the identification information including an incarnation number of a sender process and detecting whether or not the request message is a redundantly re-sent message with the reincarnation number.

23. A defect-free type remote procedure call system for use a defect-free type communications system of which a first process requests a second process for a service through a communication network and the second process sends back the result of the request to the first process, comprising:
relaying means having a first relay process for relaying a request message from the first process to the second process and a second relay process for taking over the first relay process when a defect takes place in the first relay process; and
second storing means for storing the relation of identification information of the request message and identification information of the relay message and preventing the stored content from being lost when a defect takes place in the first relay process.

24. The defect-free type remote procedure call system as set forth in claim 23,
wherein the second relay process takes over a process being relayed with reference to information stored in said second storing means when a defect takes place in the first relay process, re-sending a relay message that is being relayed when a defect takes place in the first relay process to the second process, and sending back to the first process corresponding to the reply message from the second process for the re-sent relay message when the request message is re-sent from the first process.

25. The defect-free type remote procedure call system as set forth in claim 24,
wherein said second storing means is adapted for storing a content of the relay message along with the relation of the identification information, and
wherein the second relay process is adapted for resending a relay message stored in said second storing means when a defect takes place in the first relay process.

26. The defect-free type remote procedure call system as set forth in claim 24,
wherein the second relay process is adapted for designating the content of a relay message re-sent to the second process.

27. The defect-free type remote procedure call system as set forth in claim 24,
wherein the second relay process is adapted for stopping a process for a request message re-sent from the first process until the second relay process receives the reply message from the second process.

28. The defect-free type remote procedure call system as set forth in claim 23, wherein the second relay process is adapted for referencing information stored in said second storing means, taking over a process being relayed, canceling a process for a message being relayed when a defect takes place in the first relay process, and requesting the second process to cancel a process requested by the first relay process when a defect takes place in the first relay process.

29. A defect-free type communicating method for a communication system of which a first process requests a second process for a service through a communication network and the second process sends back the result of the request to the first process, comprising the steps of:

storing the relation between a port set identifier of a port set for a set of processes for sending request messages and port identifiers of ports of the processes in the set;

automatically adding identification information including the same port set identifier to a first sent message and a re-sent message of each request message;

sending the request message with the identification information from the first process to the second process;

checking the identification information of the request message and automatically detecting whether or not the request message is a redundantly re-sent message; and performing a redundantly sent message process and sending back the result of the process executed by the second process to the first process when a redundantly re-sent message is detected.

30. A defect-free type communicating method for a communication system in which a first process requests a second process for a service through a communication network and the second process sends back the result of the request to the first process, comprising the steps of:

relaying a request message from the first process and sending the relay message to the second process;

storing the relation of identification information of the request message and identification information of the relay message to a storing region for preventing the stored content from being lost when a defect takes place in the relay function;

referring information in the storing region and re-sending the relay message being relayed to the second process when a defect takes place in the relay function; and sending back to the first process corresponding to a reply message received from the second process corresponding to the re-sent relay message when the request message is re-sent from the first process.

31. A computer-readable storage medium used to direct a computer in which a first process requests a second process for a service through a communication network and the second process sends back the result of the request to the first process to perform the functions of:

storing the relation between a port set identifier of a port set for a set of processes for sending request messages and port identifiers of ports of the processes in the set;

automatically adding identification information including the same port set identifier to a first sent message and a re-sent message of each request message;

sending the request message with the identification information from the first process to the second process;

checking the identification information of the request message and automatically detecting whether or not the request message is a redundantly re-sent message; and performing a redundantly sent message process and sending back the result of the process executed by the second process to the first process when a redundantly re-sent message is detected.

32. A computer-readable storage medium used to direct a computer in which a first process requests a second process for a service through a communication network and the second process sends back the result of the request to the first process to perform the functions of:

relaying a request message from the first process and sending the relay message to the second process;

storing the relation of identification information of the request message and identification information of the relay message to a storing region for preventing the stored content from being lost when a defect takes place in the relay function;

referring information in the storing region and re-sending the relay message being relayed to the second process when a defect takes place in the relay function; and sending back to the first process corresponding to a reply message received from the second process corresponding to the re-sent relay message when the request is re-sent from the first process.

* * * * *